(12) United States Patent
Sekikawa

(10) Patent No.: US 7,696,470 B2
(45) Date of Patent: Apr. 13, 2010

(54) OPTICAL COMMUNICATION MODULE

(75) Inventor: Ryou Sekikawa, Tokyo (JP)

(73) Assignee: Oki Semiconductor Co., Ltd., Tokyo (JP)

( * ) Notice: Subject to any disclaimer, the term of this patent is extended or adjusted under 35 U.S.C. 154(b) by 0 days.

(21) Appl. No.: 12/155,291

(22) Filed: Jun. 2, 2008

(65) Prior Publication Data
US 2009/0014633 A1     Jan. 15, 2009

(30) Foreign Application Priority Data
Jul. 11, 2007 (JP) .............................. 2007-182160

(51) Int. Cl.
*G01J 1/04* (2006.01)
*H01L 31/18* (2006.01)
(52) U.S. Cl. ...................... 250/226; 250/239
(58) Field of Classification Search ................ 250/226, 250/239
See application file for complete search history.

(56) References Cited
U.S. PATENT DOCUMENTS

| 6,843,607 | B2* | 1/2005 | Nakanishi et al. ............. 385/92 |
| 6,904,209 | B2* | 6/2005 | Okada et al. ................... 385/49 |
| 7,257,297 | B2* | 8/2007 | Kondo .......................... 385/49 |
| 7,345,832 | B2* | 3/2008 | Shibuya et al. ............... 359/811 |
| 2005/0180681 | A1* | 8/2005 | Umebayshi et al. ........... 385/15 |

FOREIGN PATENT DOCUMENTS

| JP | 6-275870 | 9/1994 |
| JP | 10-206678 | 8/1998 |
| JP | 2000-183237 | 6/2000 |
| JP | 2005-165016 | 6/2005 |
| JP | 2005-181808 | 7/2005 |
| JP | 2005-202082 | 7/2005 |
| JP | 2006-154535 | 6/2006 |

\* cited by examiner

*Primary Examiner*—Seung C Sohn
(74) *Attorney, Agent, or Firm*—Rabin & Berdo, PC

(57) ABSTRACT

The an optical communication module associated with the present invention comprises a semiconductor substrate, a light emitting element mounted on said semiconductor substrate to output light for transmission (transmitted light), a light receiving element mounted with an adhesive resin on said semiconductor substrate to convert light received (received light) to an electric signal and a wavelength filter to branch out the received light guided to said light receiving element and the transmitted light output from said light emitting element. A groove for an optical path, through which the received light passes to be guided to said light receiving element and a first protective groove formed around said groove for an optical path to block said adhesive resin from intruding into said groove for an optical path are formed on said semiconductor substrate.

13 Claims, 33 Drawing Sheets

FIG. 2
PRIOR ART
SIDE A (RECEIVING END)
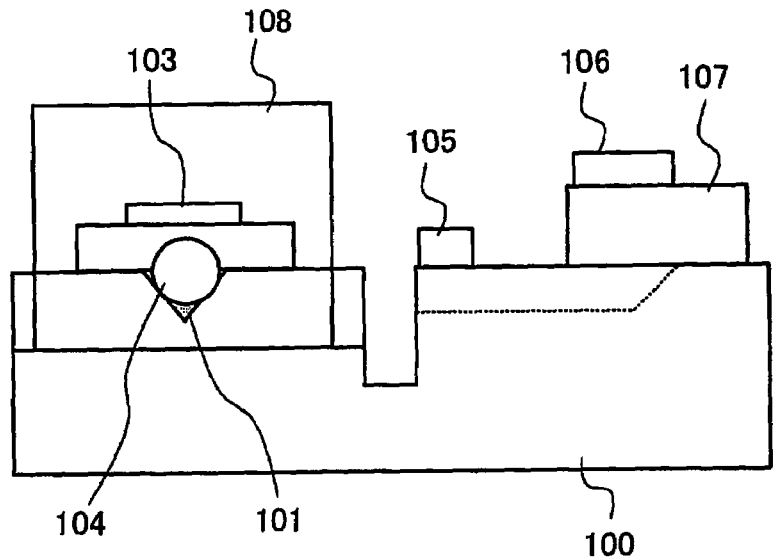
SIDE B (TRANSMITTING END)
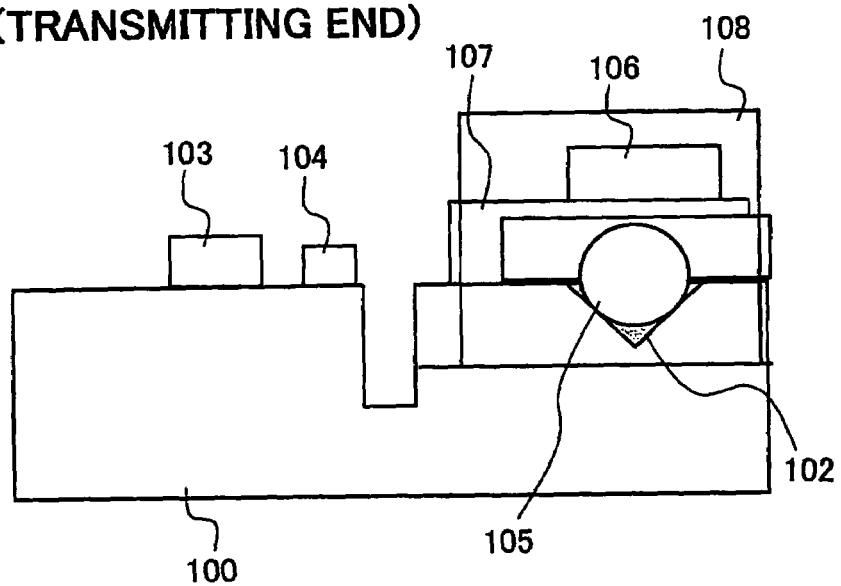

FIG. 4
PRIOR ART
RECEIVING END
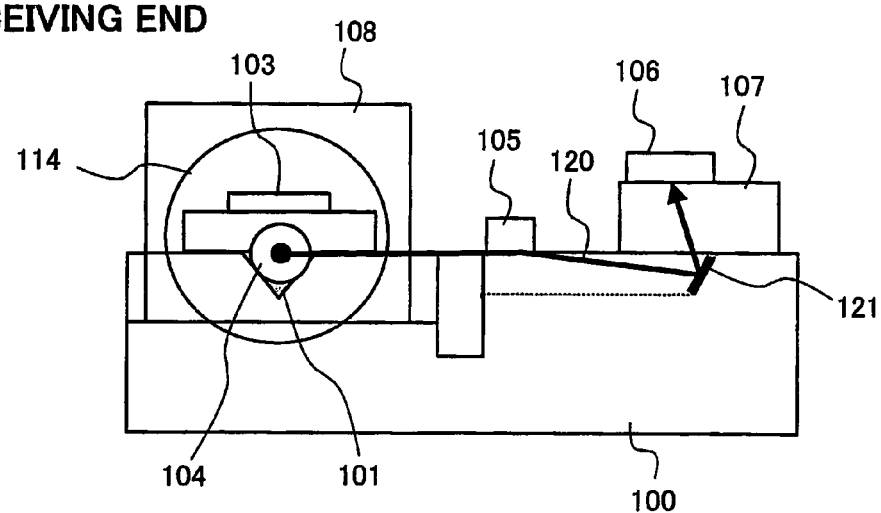
TRANSMITTING END
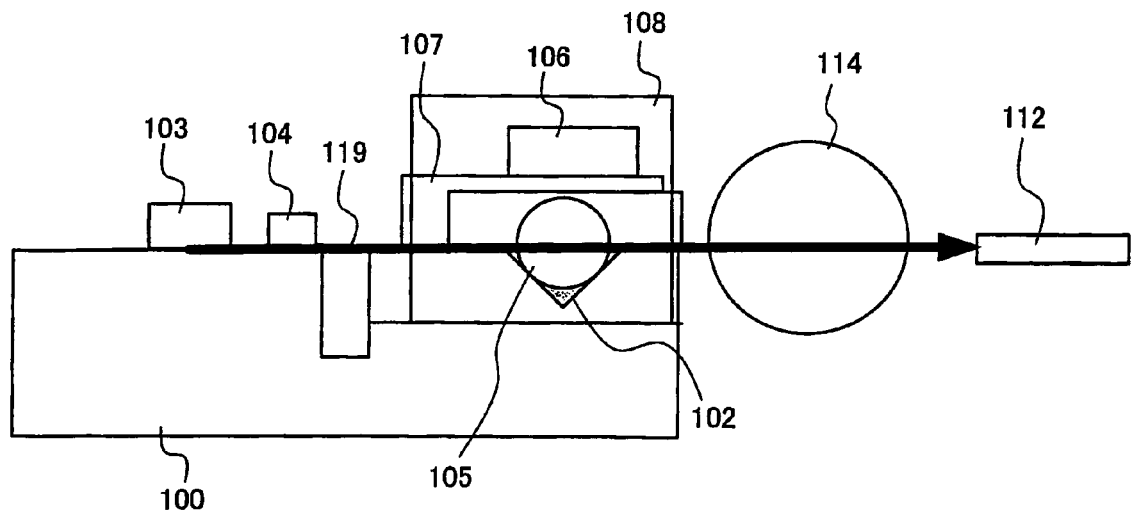

FIG. 5
PRIOR ART
(Before Adhesive Applied)
TOP VIEW
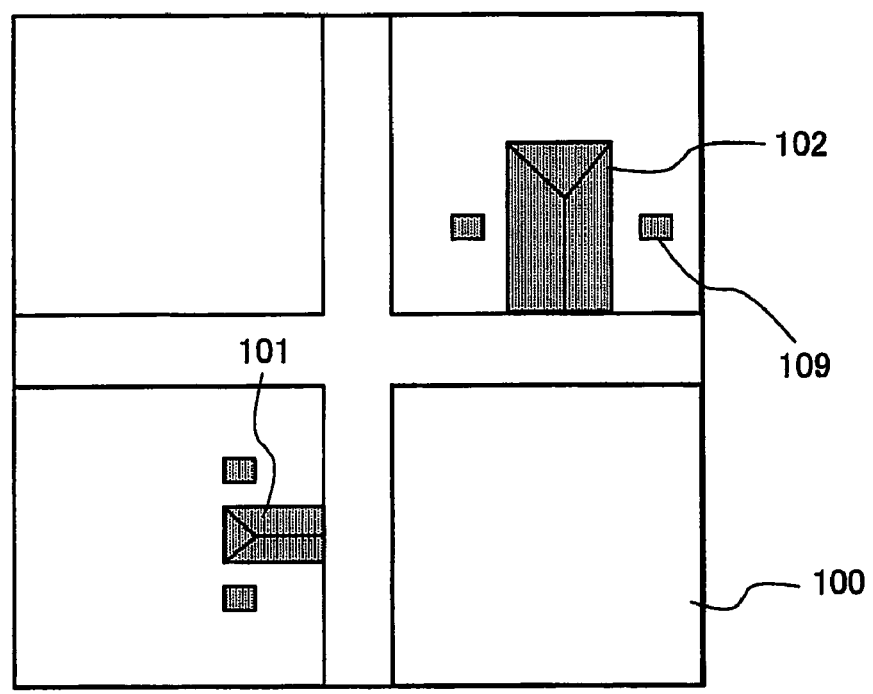
SIDE VIEW
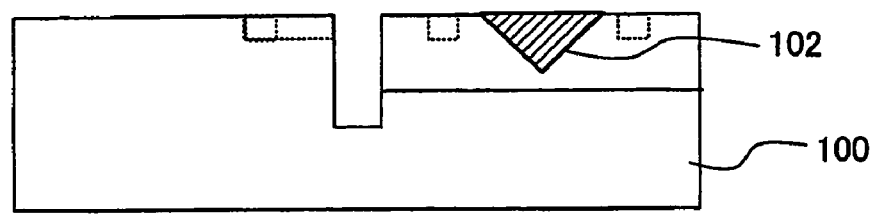

FIG. 6
PRIOR ART
(Adhesive Applied)
TOP VIEW
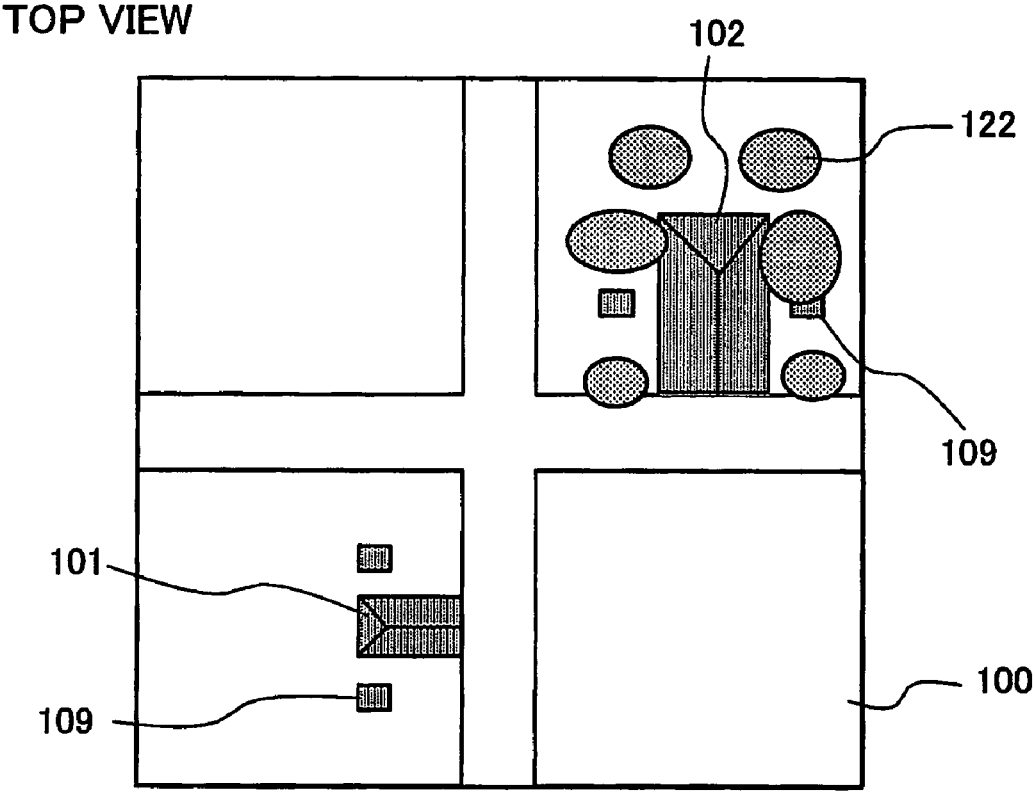
SIDE VIEW
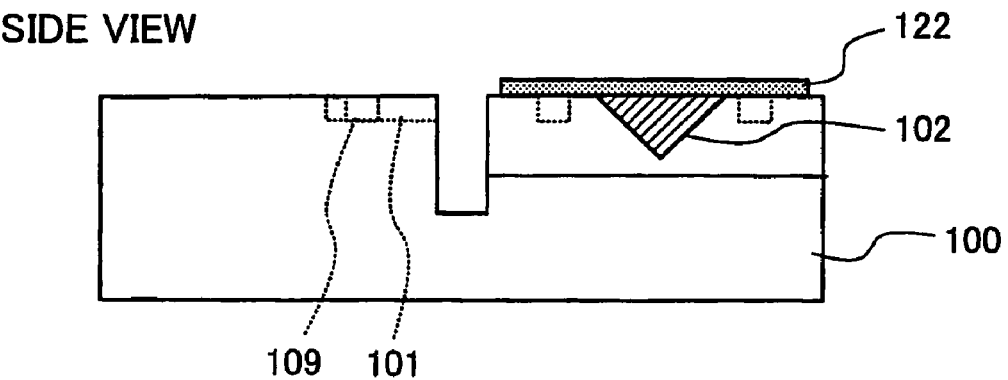

FIG. 7
PRIOR ART
(Components Mounted)
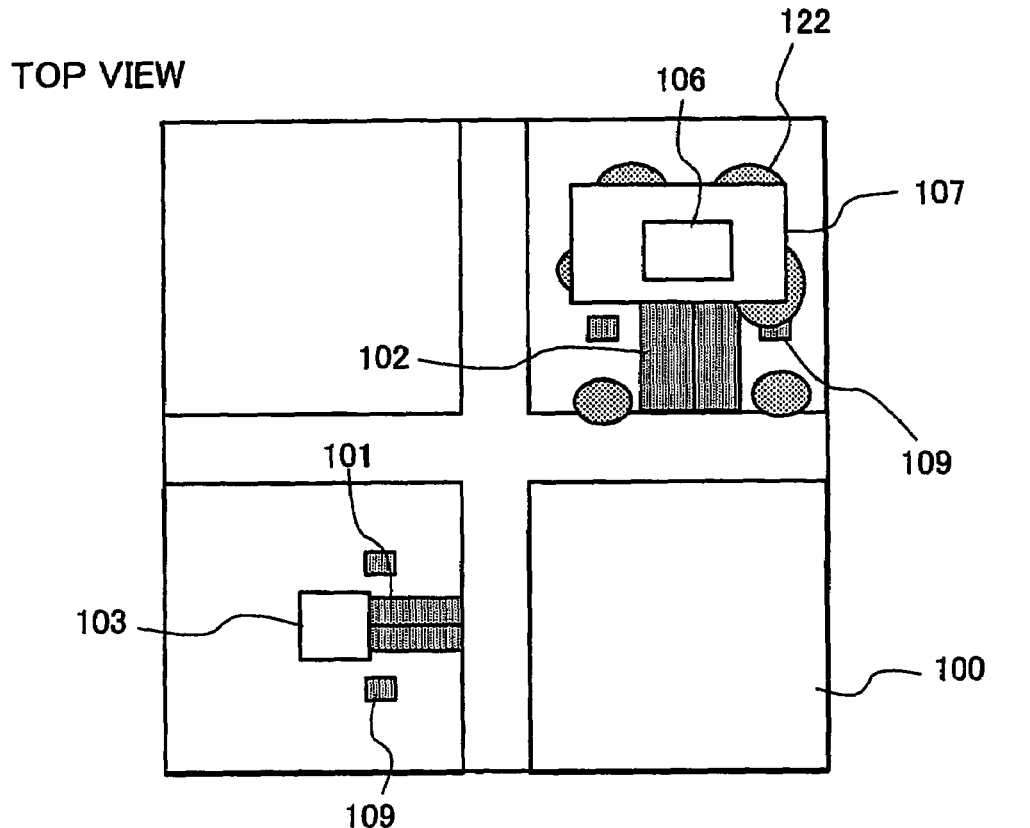
TOP VIEW
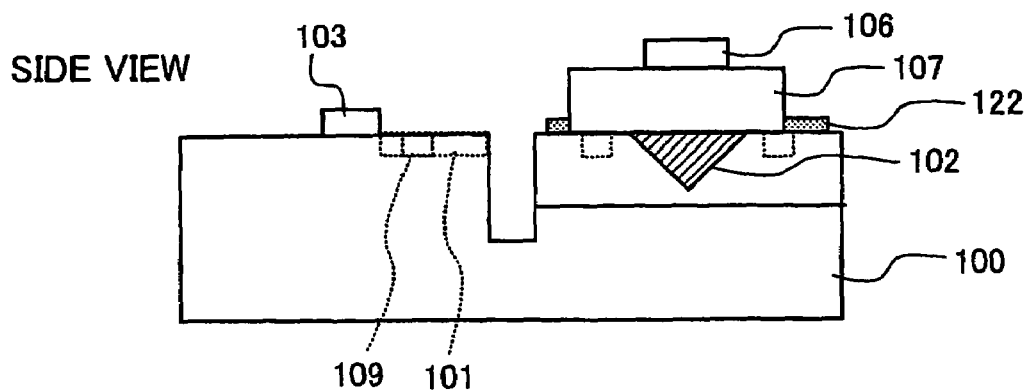
SIDE VIEW Optical Path of Receiving End

FIG. 11
SIDE A (RECEIVING END)
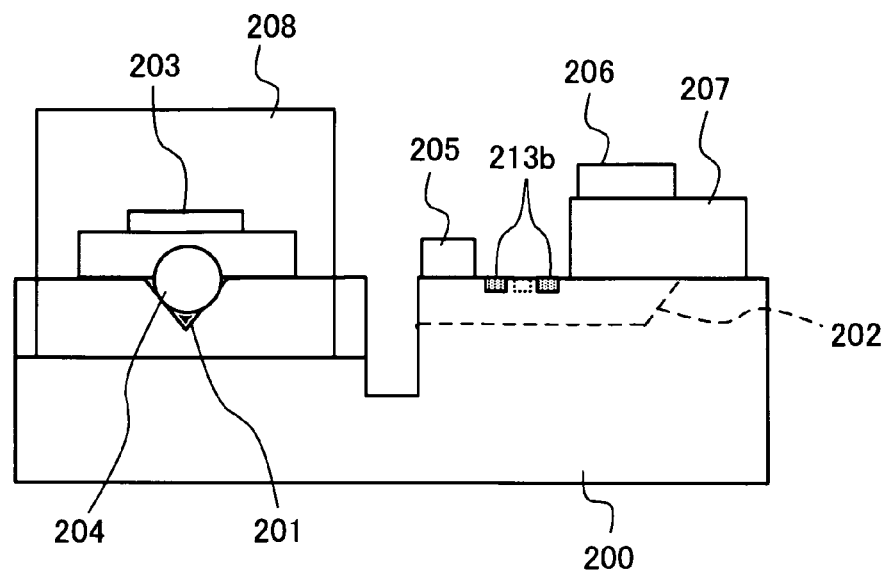
SIDE B (TRANSMITTING END)
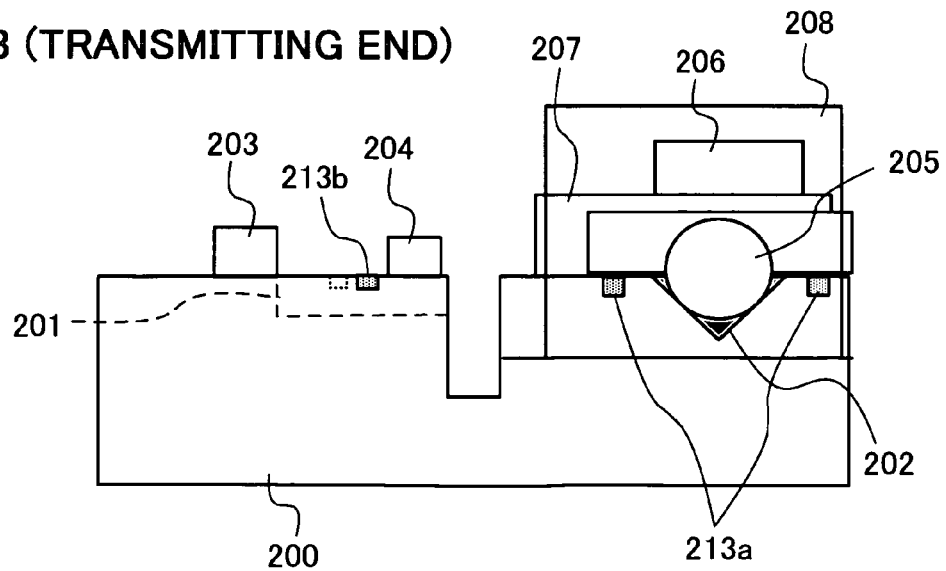

FIG. 13
RECEIVING END
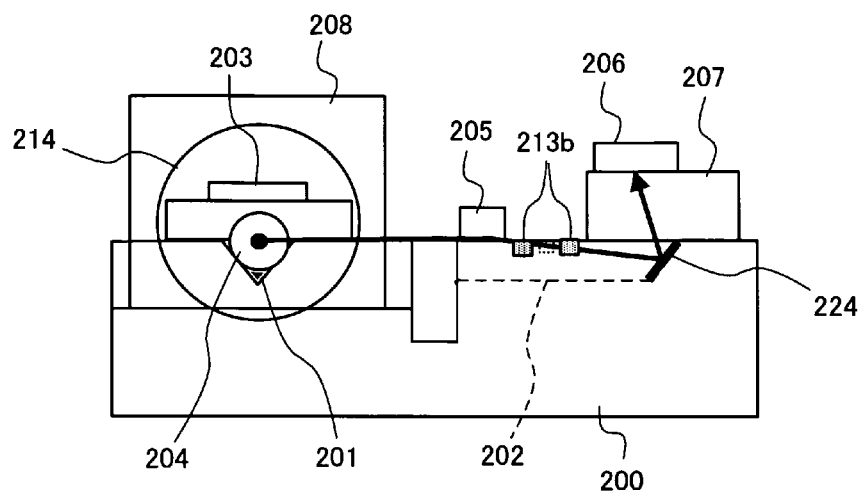
TRANSMITTING END
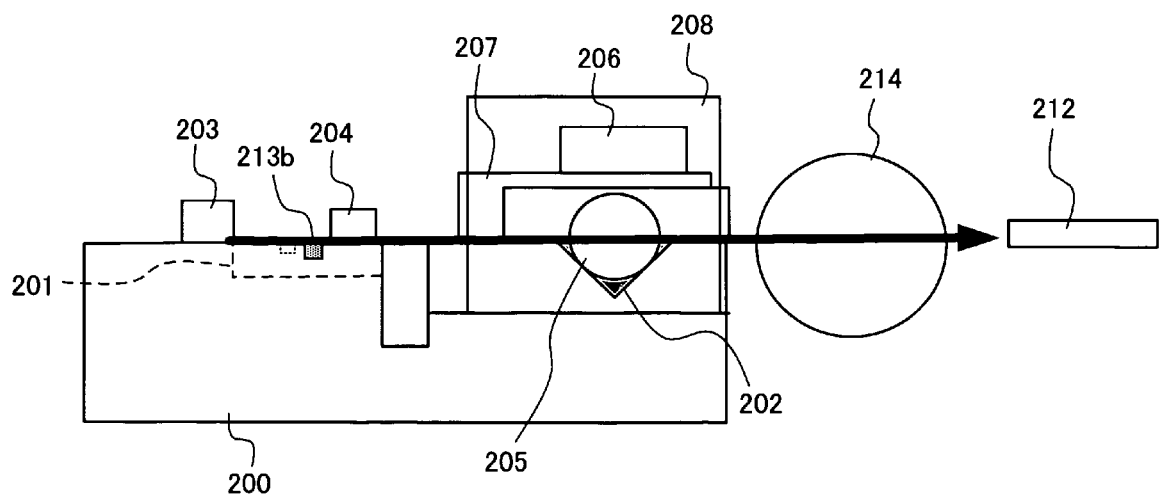

FIG. 17
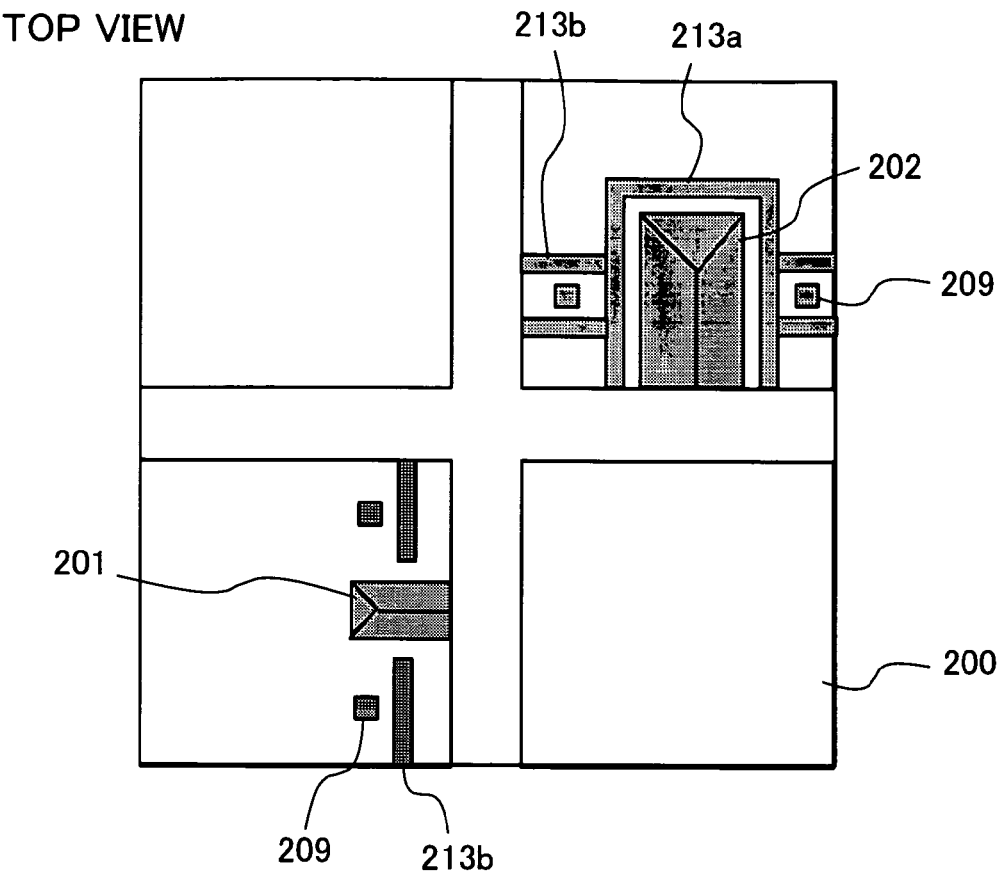
TOP VIEW
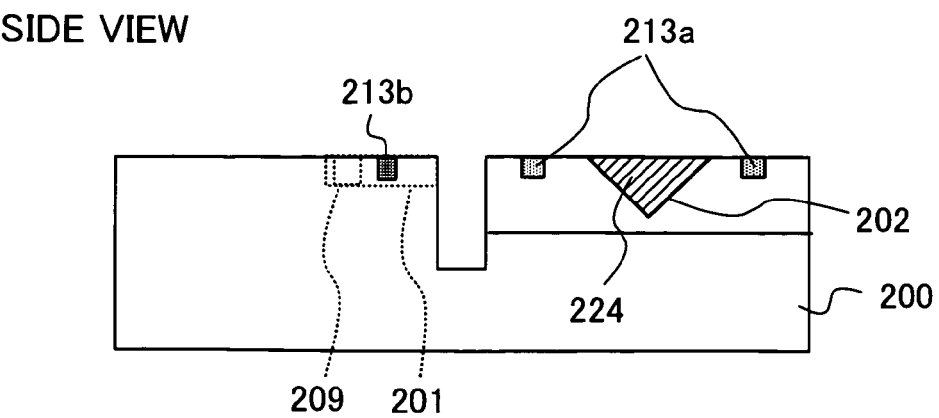
SIDE VIEW

FIG. 18
TOP VIEW
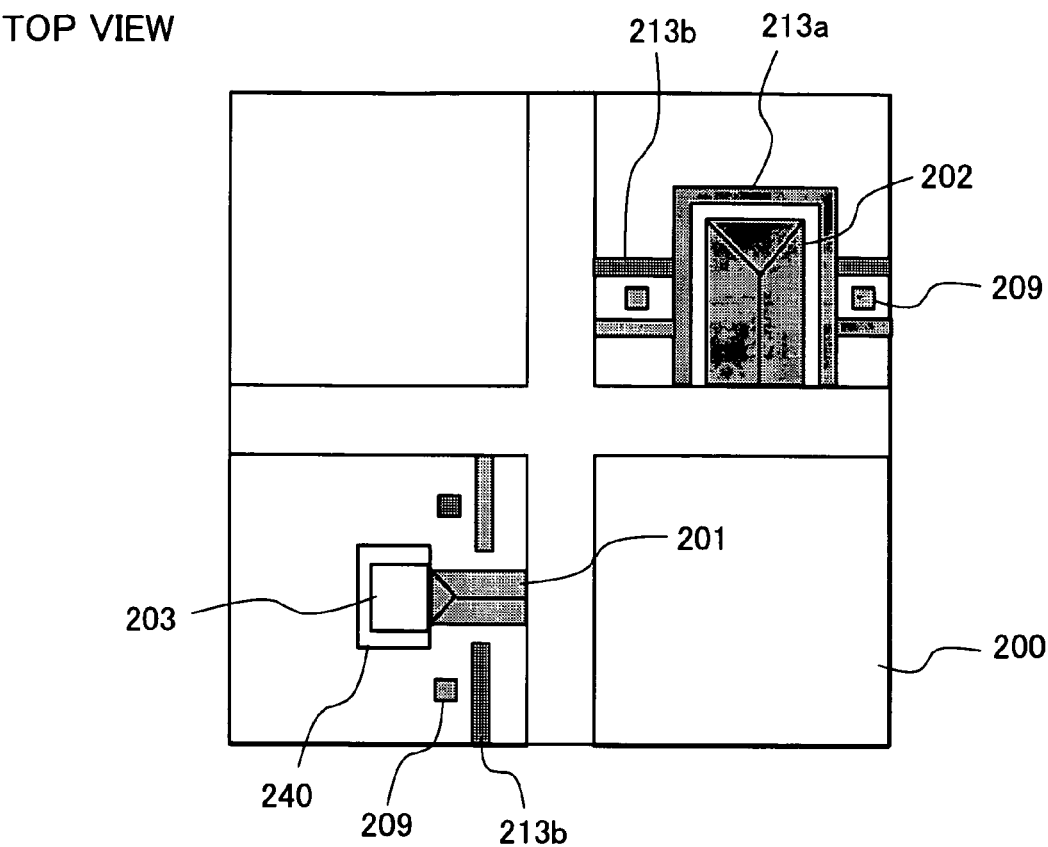
SIDE VIEW
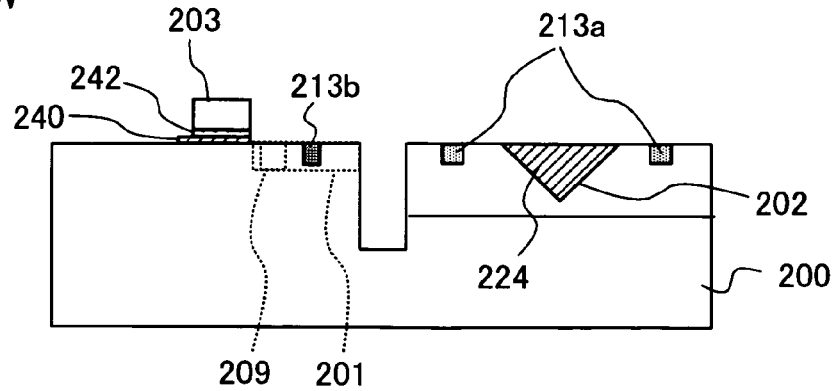

FIG. 19
TOP VIEW
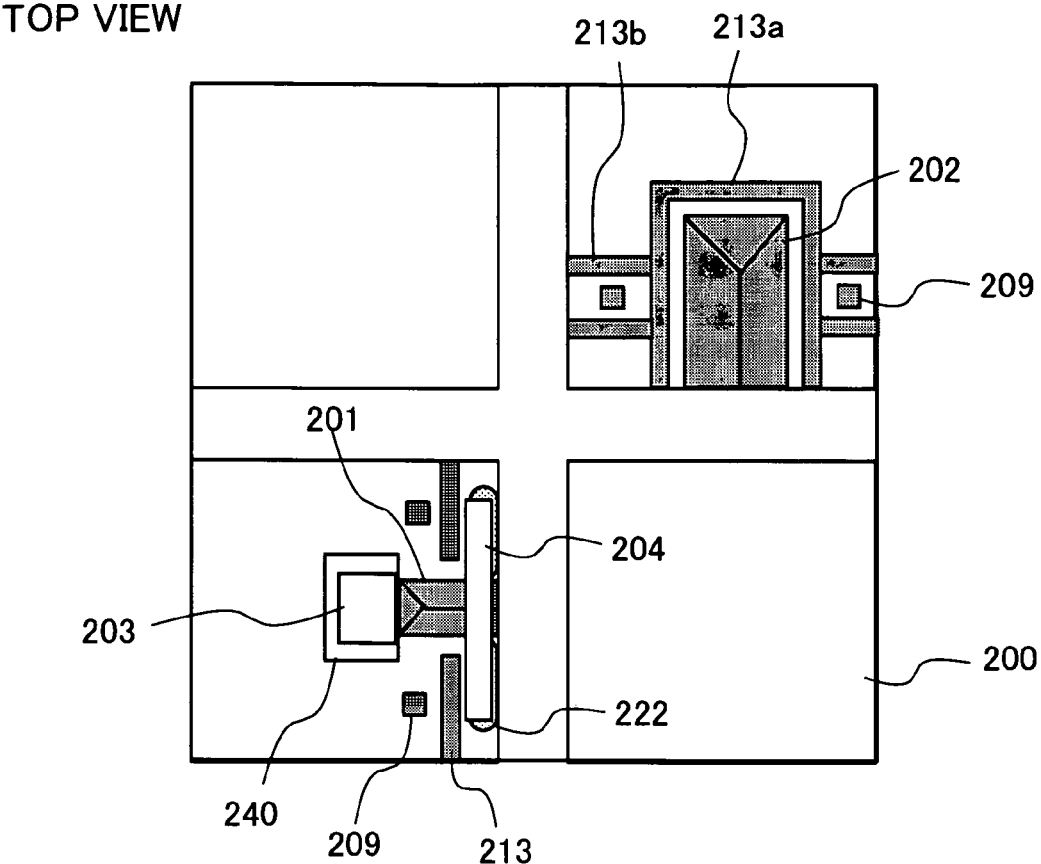
SIDE VIEW
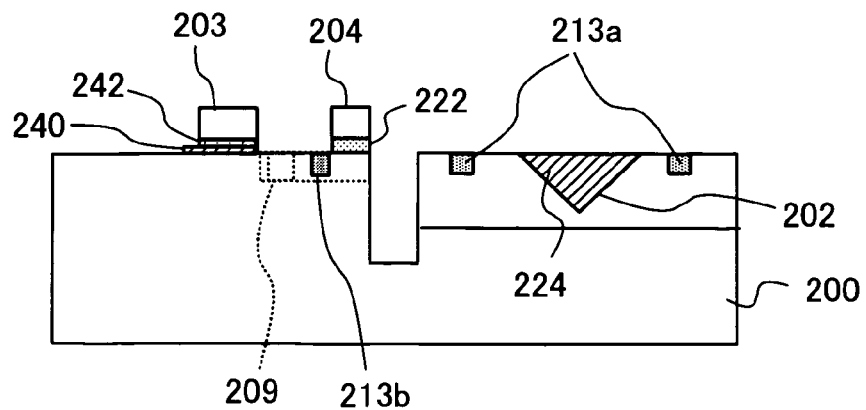

FIG. 20
TOP VIEW
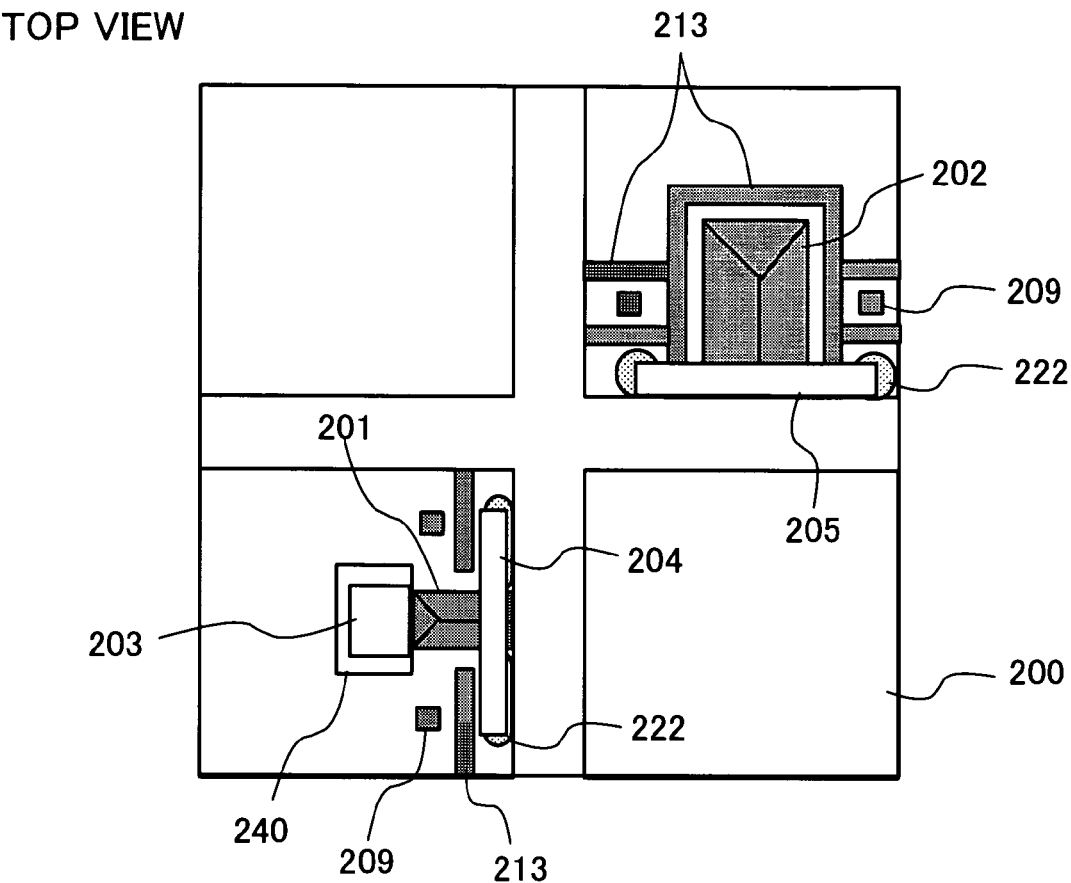
SIDE VIEW
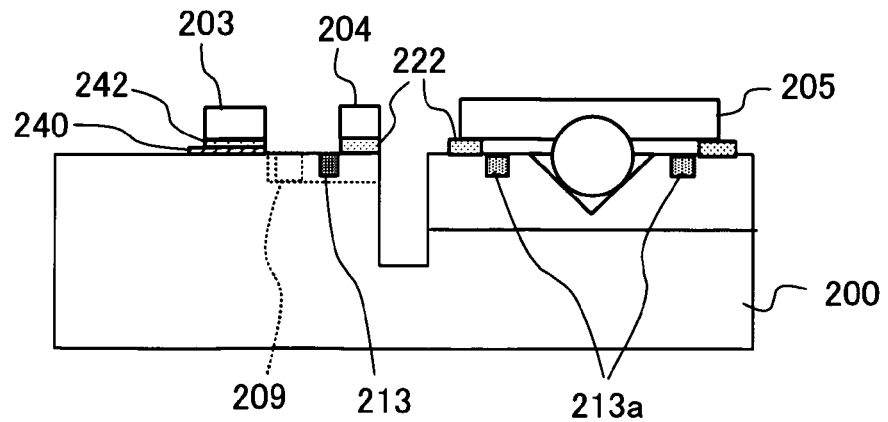

FIG. 21
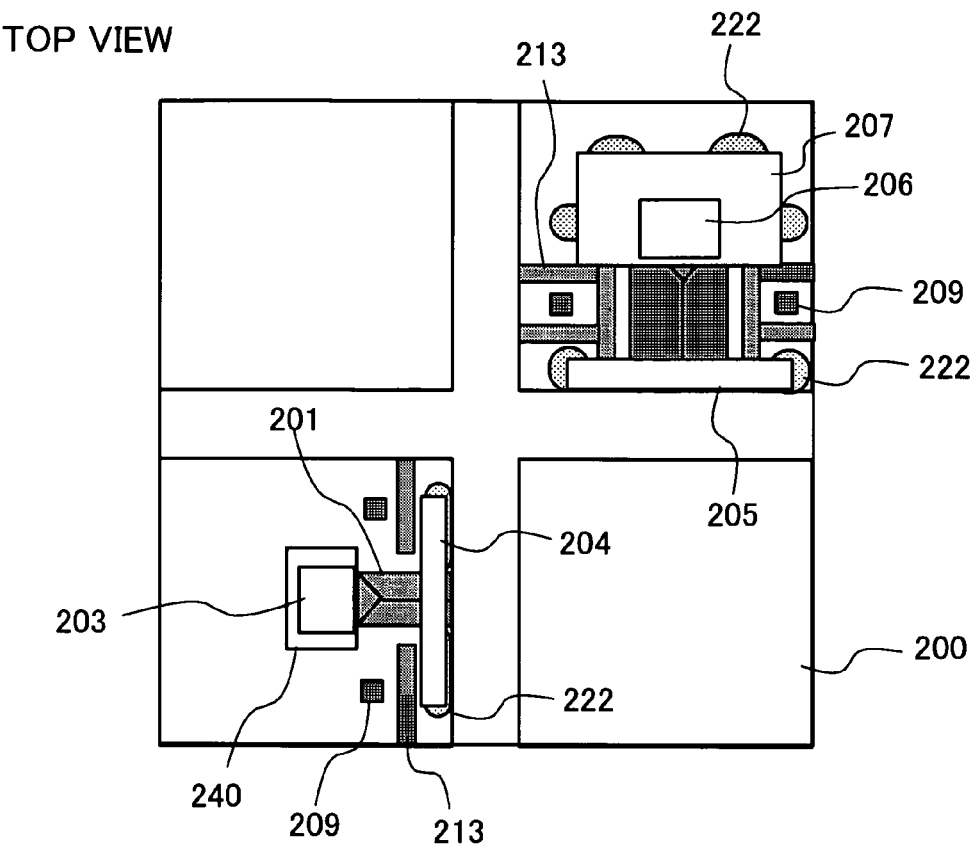
TOP VIEW
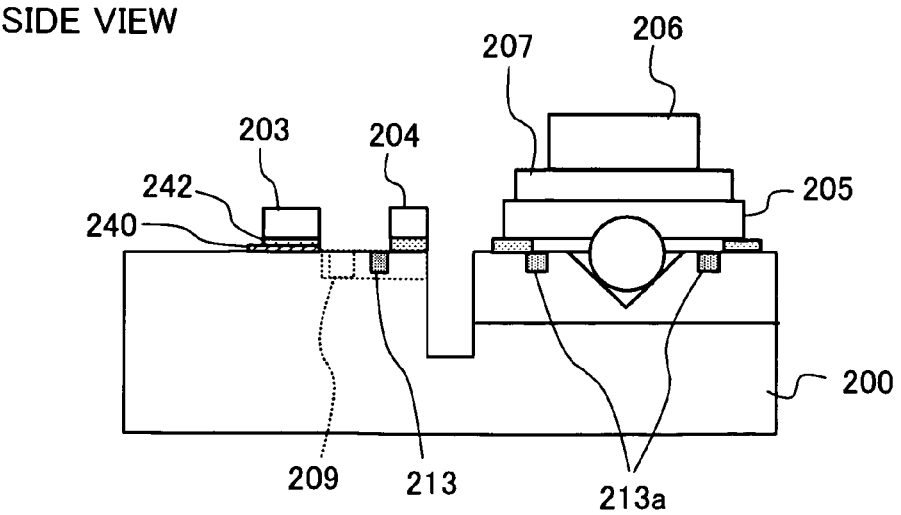
SIDE VIEW

FIG. 22
TOP VIEW
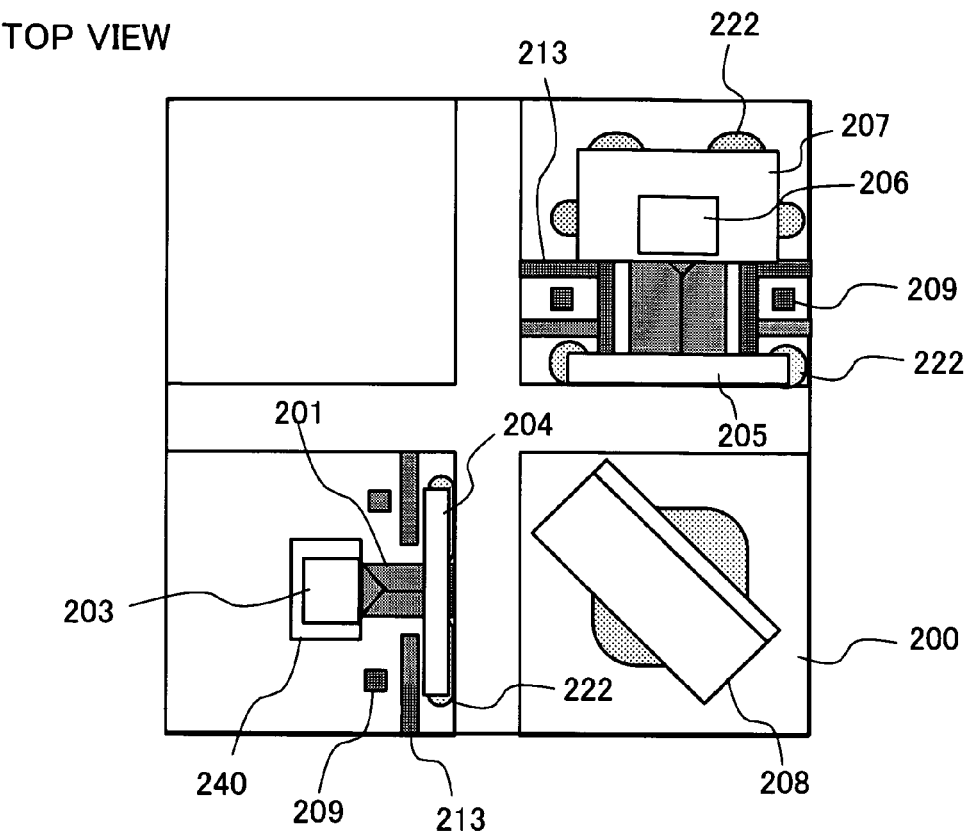
SIDE VIEW
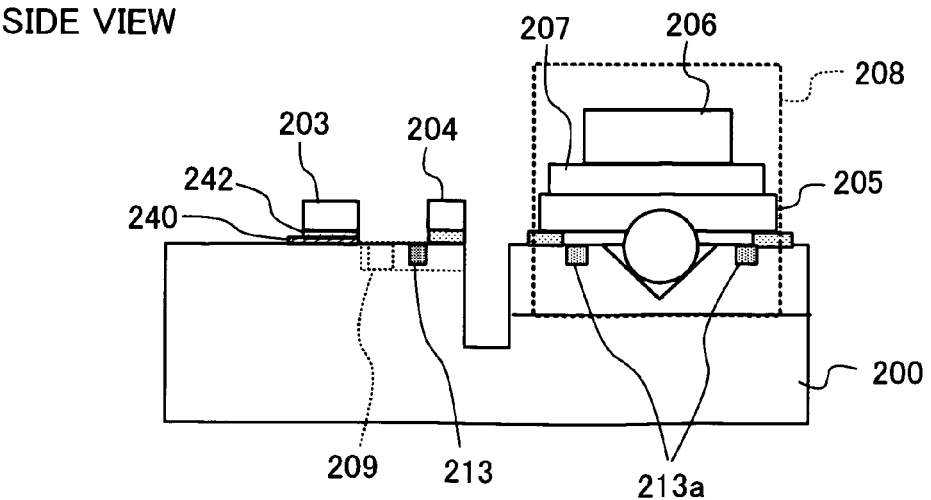

FIG. 25
SIDE A (RECEIVING END)
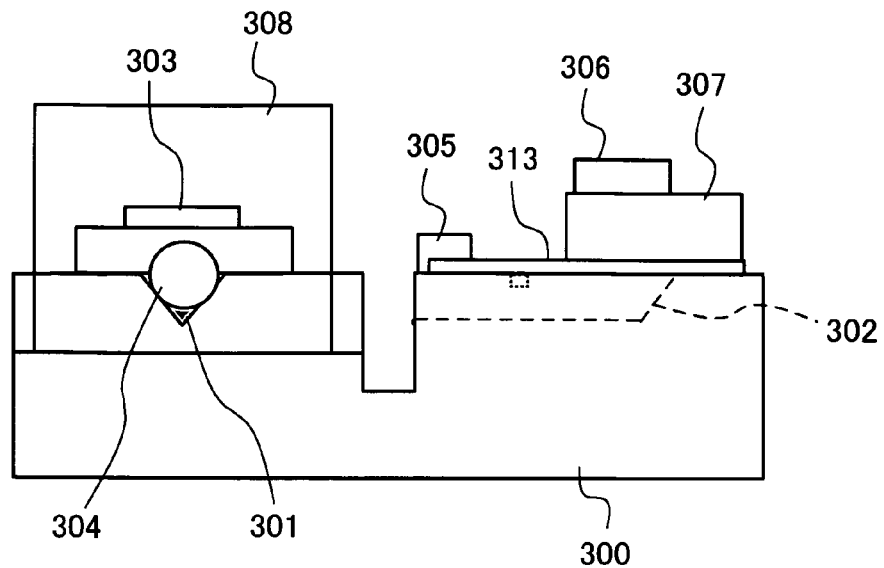
SIDE B (TRANSMITTING END)
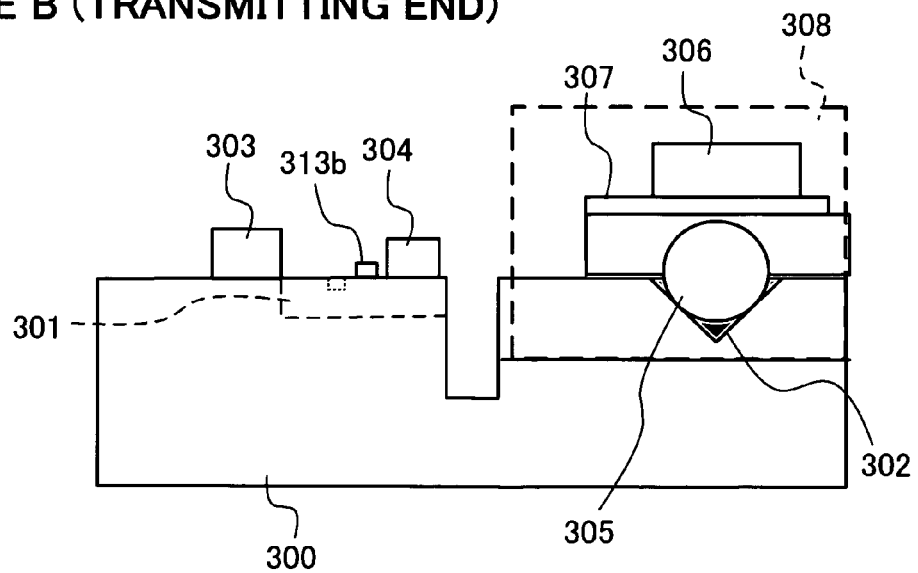

FIG. 26
(Before Adhesive Applied)
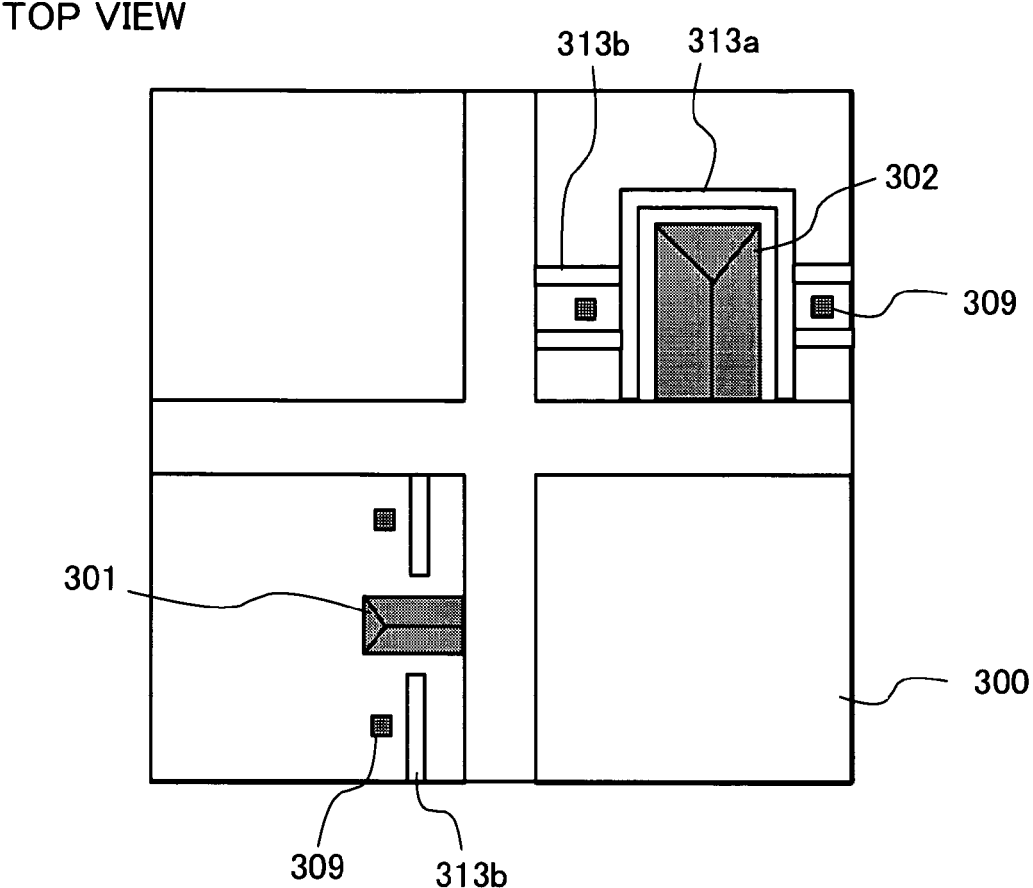
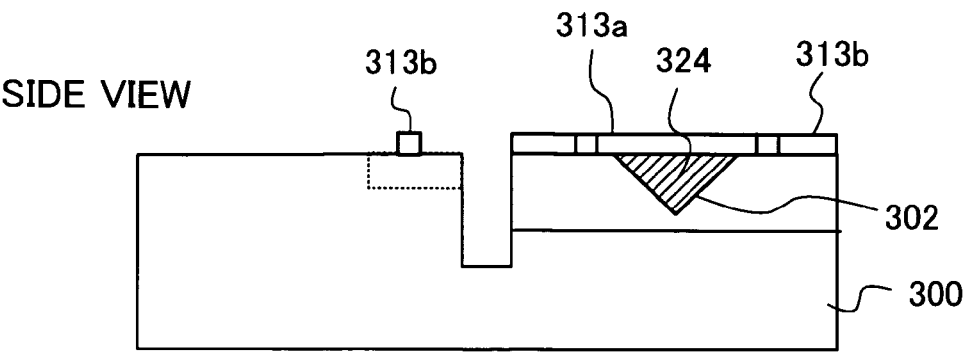

FIG. 27
(Adhesive Applied)
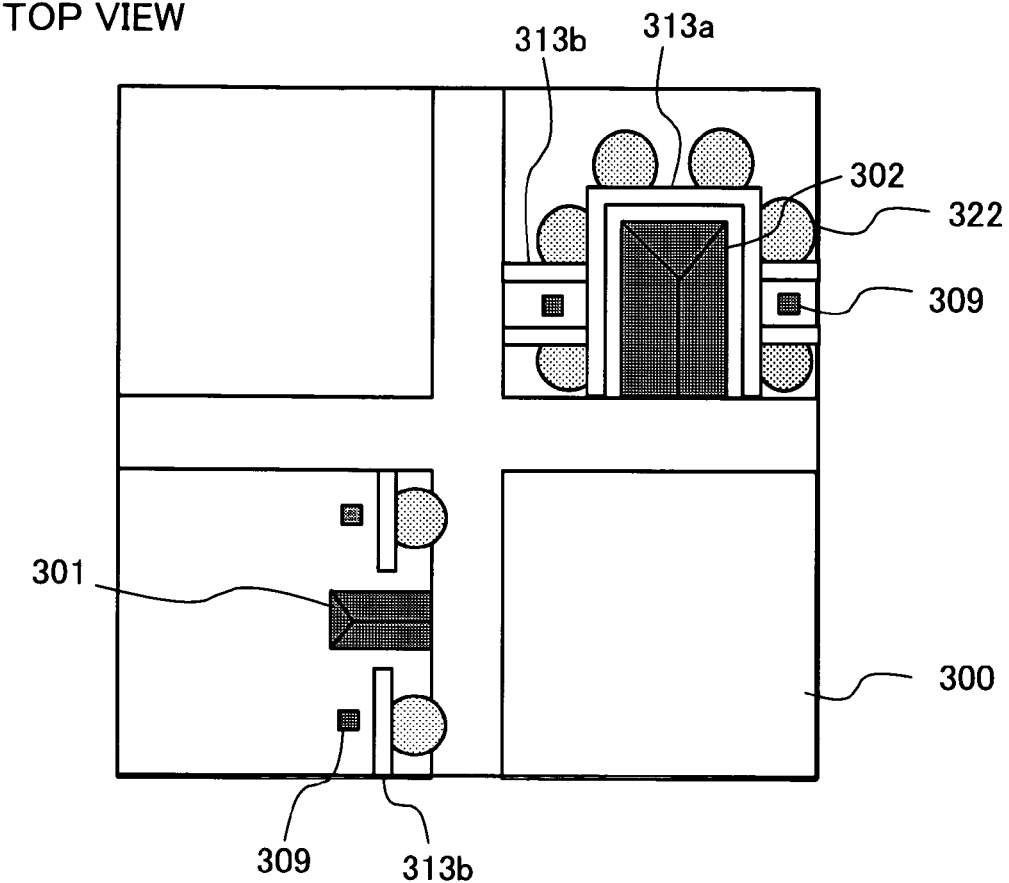
TOP VIEW
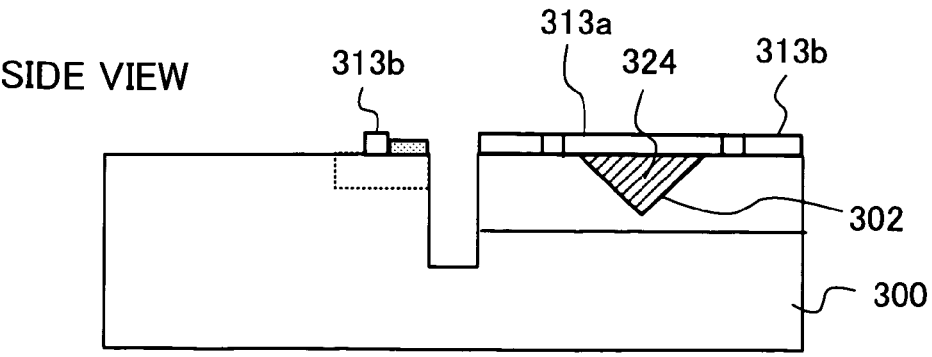
SIDE VIEW

FIG. 28
(Components Mounted)
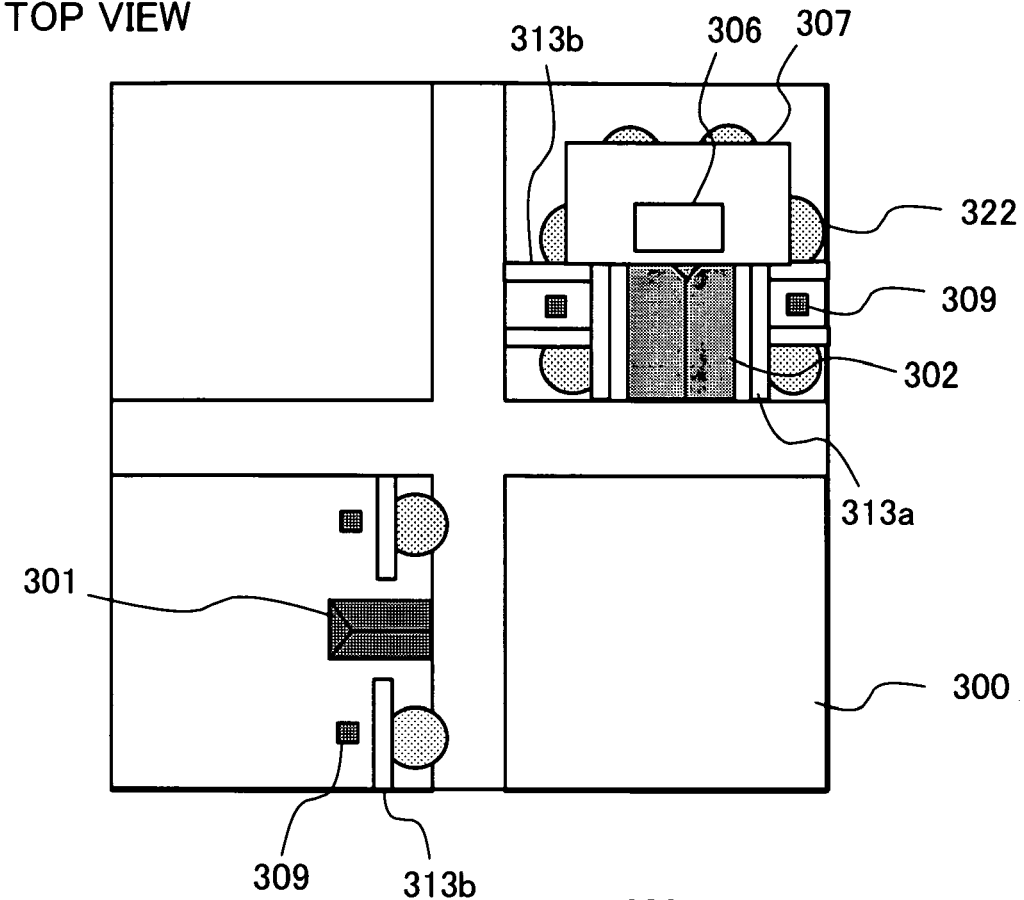
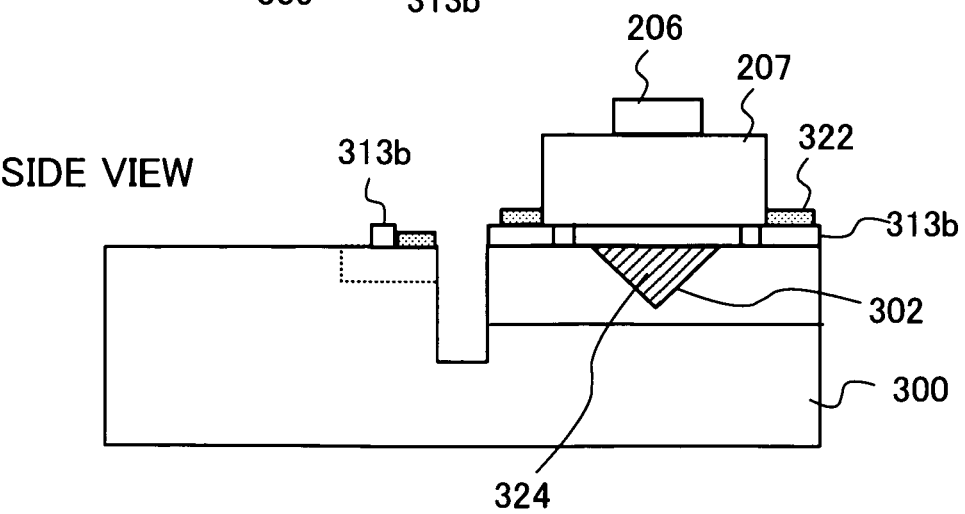

FIG. 31
TOP VIEW
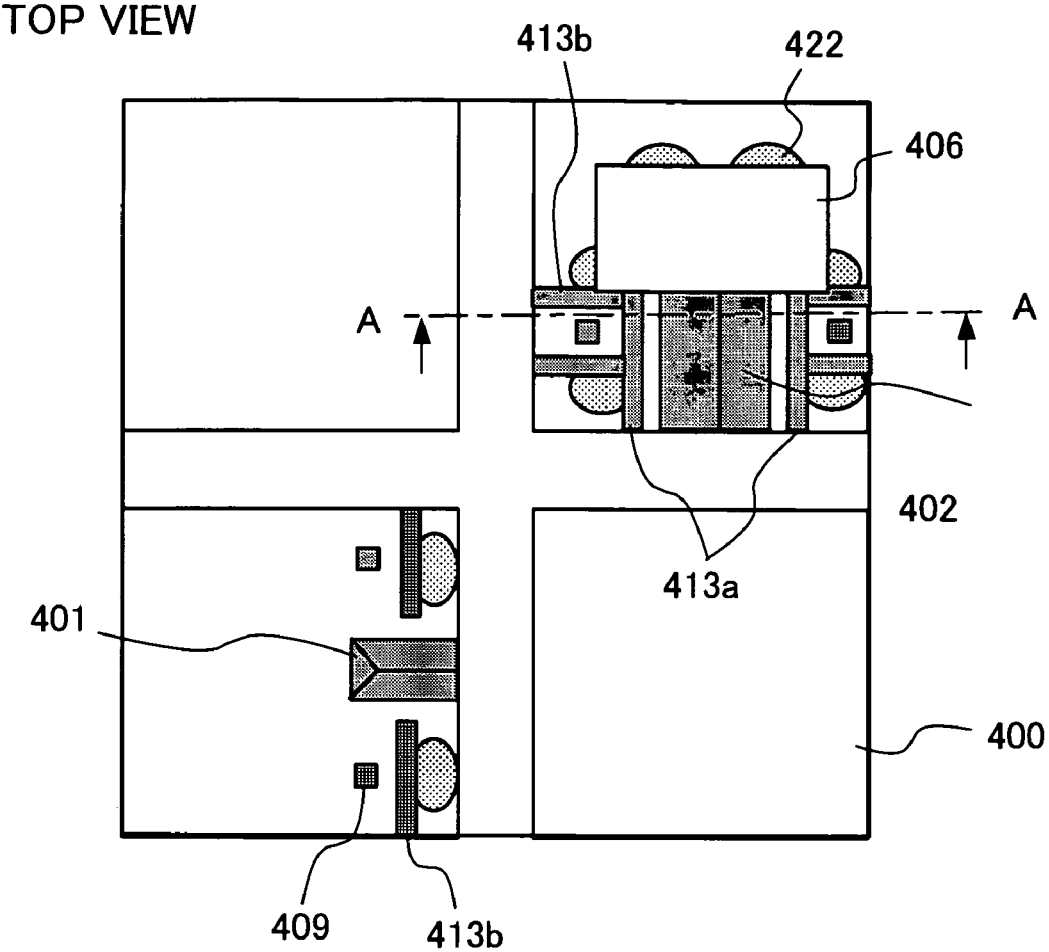
SIDE VIEW
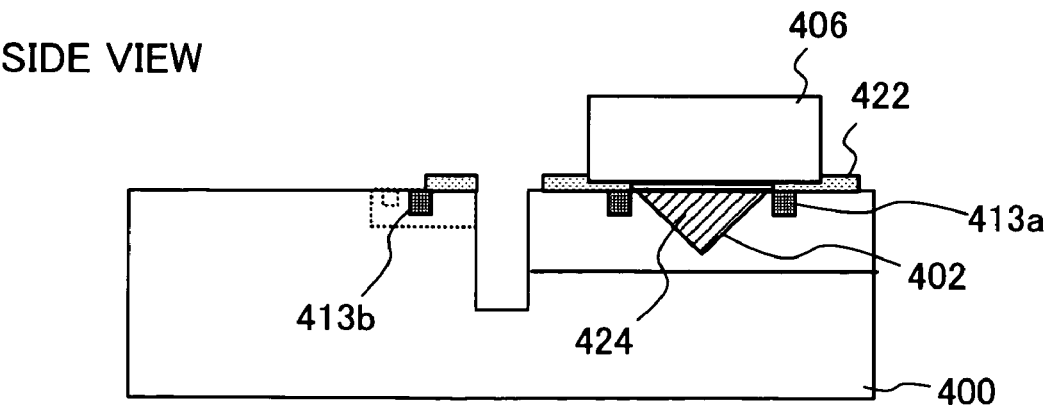

OPTICAL COMMUNICATION MODULE

CROSS REFERENCE TO RELATED APPLICATION

This application claims the priority of Application No. 2007-182160, filed Jul. 11, 2007 in Japan, the subject matter of which is incorporated herein by reference.

TECHNICAL FIELD OF THE INVENTION

The present invention relates to an optical communication module used as a communication device. The present invention relates in particular to the optical communication module, in which optical elements for transmission and reception are mounted as a whole on a substrate using a surface mounting method.

BACKGROUND OF THE INVENTION

In an optical communication network represented by Fiber To The Home (FTTH), a bi-directional communication system has become widely used. The bi-directional communication system connects a communication office with a user through a single optical fiber and bi-directionally communicates using two kinds of light with different wavelengths as a transmission signal and a reception signal, respectively.

There is such a module as disclosed in Patent Document 1 (Japanese Patent Publication H10-206678) as an example of a bi-directional communication module used in this system. In the module according to Patent Document 1, a laser module as a transmission part and a photodiode as a reception part are packaged separately. Such modules (transmission module and reception module) are as a whole packaged together with a wavelength branching filter (wavelength filter) to branch out light for transmission and light for reception. This realizes two-way communication.

However, in the system according to Patent Document 1, a transmission module and a reception module packaged have to be adjusted separately (in adjustment of an optical axis and the like), resulting in a higher manufacture cost. There is also a problem, in which a whole module becomes larger in size to make miniaturization difficult.

A bi-directional communication module according to Patent Document 2 (Japanese Patent Publication 2006-154535) and the like has been proposed as a way to solve such problems. The module according to Patent Document 2 and the like mounts a transmission part, a reception part and a wavelength filter together on a single substrate. This realizes miniaturization and lower-costing of the optical communication module.

FIG. 1 is a perspective view illustrating a structure of a conventional bi-directional communication module disclosed in Patent Document 2. FIG. 2 is a side view illustrating an appearance of FIG. 1 observed from Side A (receiving end) and Side B (transmitting end). In FIGS. 1 and 2, an alignment mark 109 used to align with the element when mounted and V-grooves 101, 102 with a V-shape cross-section when laterally observed are formed by anisotropic etching on a silicone substrate 100 as a support substrate. A laser chip (LD) 103 of emitting light for transmission, a lens at the transmitting end 104, a lens at the receiving end 105, a light receiving element (PD) of converting an optical signal to an electric signal 106, a glass element 107 and a wavelength filter 108 are mounted on this substrate 100 to manufacture the optical communication module.

A method of bi-directional communication by an optical communication module disclosed in Patent Document 2 is next described. FIG. 3 is a plan view illustrating an optical path in a conventional optical module shown in FIG. 1. FIG. 4 is a side view illustrating the optical path divided into the receiving end and the transmitting end in the conventional optical module shown in FIG. 1. As shown in FIGS. 3 and 4, light for transmission 119 emitted from LD 103 is collimated by a proximal lens 104 when transmitted, followed by passing through a wavelength filter 108 to converge by a ball lens 114 to an optical fiber 112.

Light for reception 120 emitted from the optical fiber 112 is diffracted by a ball lens 114 when received, followed by refracting by 90 degrees at a reflection film of a wavelength filter 108 to reach a lens at the receiving end 105. After light for reception 120 is diffracted at a lens 105, it passes through a V-groove 102 at a side of light for reception to be reflected at a reflection plane (not shown) formed on an end plane of a V-groove 102, reaching a plane of light for reception of PD 106 mounted on the top surface therein through a glass element 107.

In the bi-directional communication according to the above system, each of LD 103 and PD 106 mounted on one substrate has to be electrically and optically separated (insulated) in order to prevent an effect of noises. A glass element 107 is thus configured between a substrate 100 and PD 106 and an adhesive 122 is used to adhere the substrate 100 to the glass element 107.

FIGS. 5-7 are top and side views illustrating part of processes of assembling a conventional optical communication module shown in FIG. 1. A state prior to application of an adhesive resin, a state posterior to application of the adhesive resin and a state after mounting the element on the adhesive resin are illustrated in FIG. 5, FIG. 6 and FIG. 7, respectively.

After starting the state shown in FIG. 5, the adhesive resin 122 is applied around V-grooves 101, 102 on the substrate 100 as shown in FIG. 6. As shown in FIG. 7, the adhesive resin is then thermally cured to adhere while pressing the glass electrode 107.

FIG. 8 is an illustrative view (side view) showing problems with a conventional optical communication module shown in FIG. 1. FIG. 9 is an illustrative view (side view of an optical path at the receiving end) showing problems with the conventional optical communication module shown in FIG. 1.

As shown in FIG. 8, such a conventional system as above causes problems when the adhesive resin 122 is applied excessively in the adhesive resin 122 applying process or the glass element 107 is pressed on the adhesive 122 to mount the element, shifting the resin 122 along the substrate 100. That is, this causes such a phenomenon as a flow of the adhesive resin 122 into the V-groove 102 and the alignment mark 109.

The alignment mark 109 serves as a reference coordinate to calculate a mounting position of the element on the substrate 100 in an image recognition process when the element is mounted. When the adhesive resin 122 is flown into the alignment mark 109, the adhesive resin 122 thus casts a shadow to prevent the alignment mark 109 from being recognized accurately. Recognition error consequently occurs in image recognition, disabling to mount the element or leading to misalign the element.

As shown in FIG. 9, the adhesive resin 122 flown into the V-groove 102 fills an inside of the V-groove 102 to be fixed, thus covering a reflective layer 121. A route of the light for reception 120 delivered through an optical fiber is thus blocked by the adhesive resin 122 so that the light reception cannot normally reach a light receiving part of PD 106, resulting in an error with the light for reception.

Patent Document 3 (Japanese Patent Publication 2000-183237) discloses a semiconductor apparatus, in which a semiconductor chip is mounted on a printed circuit board and illustrates a structure, in which an adhesive resin is prevented to spread from a surrounding of the semiconductor chip, thus enabling to mount in higher density.

Patent Document 1: Japanese Patent Publication H10-206678
Patent Document 2: Japanese Patent Publication 2006-154535
Patent Document 3: Japanese Patent Publication 2000-183237

OBJECTS OF THE INVENTION

The present invention has been carried out in conjunction with the above state and has a purpose to provide an optical communication module, which can avoid a problem caused by spilling an adhesive resin.

Additional objects, advantages and novel features of the present invention will be set forth in part in the description that follows, and in part will become apparent to those skilled in the art upon examination of the following or may be learned by practice of the invention. The objects and advantages of the invention may be realized and attained by means of the instrumentalities and combinations particularly pointed out in the appended claims.

SUMMARY OF THE INVENTION

According to a first aspect of the present invention, an optical communication module comprises a semiconductor substrate, a light emitting element mounted on the semiconductor substrate to output light for transmission (transmitted light), a light receiving element mounted with an adhesive resin on the semiconductor substrate to convert light received (received light) to an electric signal and a wavelength filter to branch out the received light guided to the light receiving element and the transmitted light output from the light emitting element. A groove for an optical path, through which the received light passes to be guided to the light receiving element and a first protective groove formed around the groove for an optical path of blocking the adhesive resin from intruding into said groove for an optical path are formed on the semiconductor substrate.

According to a second aspect of the present invention, the optical communication module comprises a semiconductor substrate, a light emitting element mounted on the semiconductor substrate to output light for transmission (transmitted light), a light receiving element mounted with an adhesive resin on the semiconductor substrate to convert light received (received light) to an electric signal and a wavelength filter to branch out the received light guided to the light receiving element and the transmitted light output from the light emitting element. A groove for an optical path, through which the received light passes to be guided to the light receiving element and a first convex bump formed around the groove for the optical path of blocking the adhesive resin from intruding into said groove for the optical path are formed on the semiconductor substrate.

According to a third aspect of the present invention, the optical communication module comprises a semiconductor substrate, a light emitting element mounted on the semiconductor substrate to output light for transmission (transmitted light), a light receiving element mounted with an adhesive resin on the semiconductor substrate to convert light received (received light) to an electric signal and a wavelength filter to branch out the received light guided to the light receiving element and the transmitted light output from the light emitting element. A plurality of concave alignment marks to align the position on the semiconductor substrate is formed on said semiconductor substrate. A second protective groove of blocking the adhesive resin from intruding into said alignment mark is formed near the alignment mark.

In the third aspect of the present invention, the second protective groove can be formed between at least a region applied with the adhesive resin and the alignment mark.

A groove for an optical path, through which a received light passes to be guided to the light receiving element can be formed on the semiconductor substrate. The groove for an optical path may be a groove with a V-shape cross-section.

In the present application, "wavelength filter" may be a WDM (Wavelength Division Multiplexing) filter.

The optical communication module preferably comprises a silicon lens for output of refracting the transmitted light output from the light emitting element and a silicon lens for input of diffracting the received light incident to the light receiving element. The silicon lens for input is aligned herein based on the groove for an optical path. At least part of the bottom surface of the light receiving element is configured on the groove for an optical path. A reflection member of guiding the received light diffracted by the silicon lens for input to the light receiving element is configured on the groove for an optical path.

A filter of blocking the transmitted light output from the light emitting element is preferably configured on the light receiving element.

According to the above configuration of the present invention, the alignment mark and the groove for an optical path are isolated by a protective groove or a convex bump from the adhesive resin, so that the protective groove or convex bump blocks the adhesive resin from undesired spill, thus preventing to reach the alignment mark and the groove for an optical path, even if a location of the adhesive resin applied deviates or an amount of the resin applied is excessive. This allows retaining a shape of the alignment mark. This also allows securing the optical path within the groove for an optical path.

Moreover, it was confirmed that each element can be accurately mounted on a semiconductor substrate regardless of an error with the location of the adhesive resin applied and the amount of the resin applied.

BRIEF DESCRIPTION OF THE DRAWINGS

FIG. 2 is a side view illustrating an appearance of FIG. 1 observed from Side A (receiving end) and Side B (transmitting end).

FIG. 4 is a side view illustrating an optical path in a conventional optical communication module shown in FIG. 1 divided into a receiving end and a transmitting end.

FIG. 5 is top and side views illustrating part of processes to assemble the conventional optical communication module shown in FIG. 1 and illustrates a state prior to application of an adhesive resin.

FIG. 6 is top and side views illustrating part of processes to assemble the conventional optical communication module shown in FIG. 1.

FIG. 7 is top and side views illustrating part of processes to assemble the conventional optical communication module shown in FIG. 1 and illustrates a state after mounting an element on an adhesive resin.

FIG. 11 is a side view illustrating an appearance of FIG. 10 observed from Side A (receiving end) and Side B (transmitting end).

FIG. 13 is a side view illustrating an optical path in the optical communication module associated with Embodiment 1 shown in FIG. 10 divided into a receiving end and a transmitting end.

FIG. 17 is top and side views illustrating part of processes to manufacture the optical communication module associated with Embodiment 1 shown in FIG. 10 and illustrates a state of a semiconductor substrate after individuation.

FIG. 18 is top and side views illustrating part of processes to manufacture the optical communication module associated with Embodiment 1 shown in FIG. 10 and illustrates a state after mounting a laser diode.

FIG. 19 is top and side views illustrating part of processes to manufacture the optical communication module associated with Embodiment 1 shown in FIG. 10 and illustrates a state after mounting a silicon lens at the transmitting end.

FIG. 20 is top and side views illustrating part of processes to manufacture the optical communication module associated with Embodiment 1 shown in FIG. 10 and illustrates a state after mounting a silicon lens at the receiving end.

FIG. 21 is top and side views illustrating part of processes to manufacture the optical communication module associated with Embodiment 1 shown in FIG. 10 and illustrates a state after mounting a glass plate and a photodiode.

FIG. 22 is top and side views illustrating part of processes to manufacture the optical communication module associated with Embodiment 1 shown in FIG. 10 and illustrates a state after mounting a wavelength filter.

FIG. 25 is a side view illustrating an appearance of FIG. 24 observed from Side A (receiving end) and Side B (transmitting end).

FIG. 26 is top and side views illustrating part of processes to manufacture the optical communication module associated with Embodiment 2 shown in FIG. 24 and illustrates a state prior to application of an adhesive resin to a semiconductor substrate.

FIG. 27 is top and side views illustrating part of processes to manufacture the optical communication module associated with Embodiment 2 shown in FIG. 24 and illustrates a state posterior to application of an adhesive to a semiconductor substrate.

FIG. 28 is top and side views illustrating part of processes to manufacture the optical communication module associated with Embodiment 2 shown in FIG. 24 and illustrates a state after mounting an element on a semiconductor substrate by applying an adhesive resin.

FIG. 31 is top and side views illustrating part of processes to manufacture the optical communication module associated with Embodiment 3 shown in FIG. 30 and illustrates a state after mounting an element on a semiconductor substrate by applying an adhesive resin.

Figure 1:
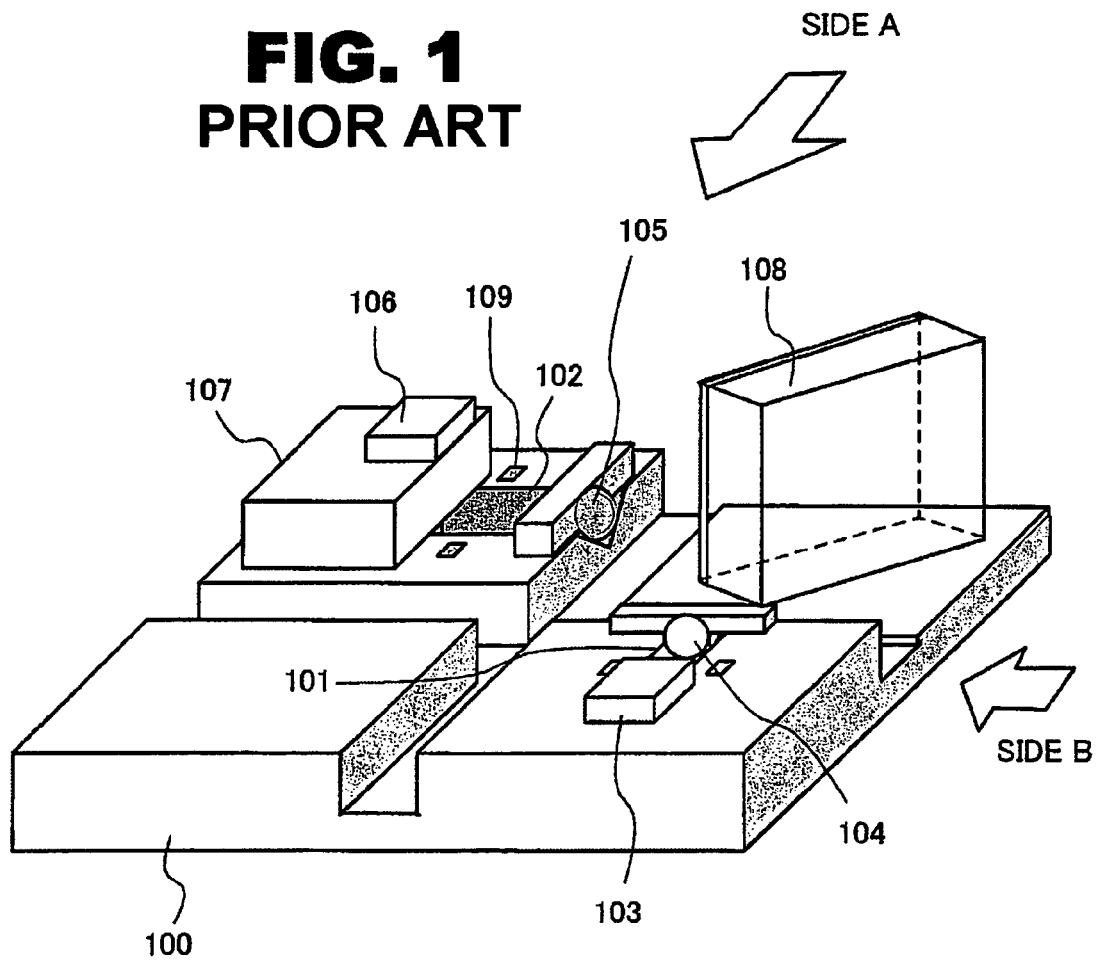
FIG. 1 is a perspective view illustrating a structure of a conventional optical communication module.
Figure 3:
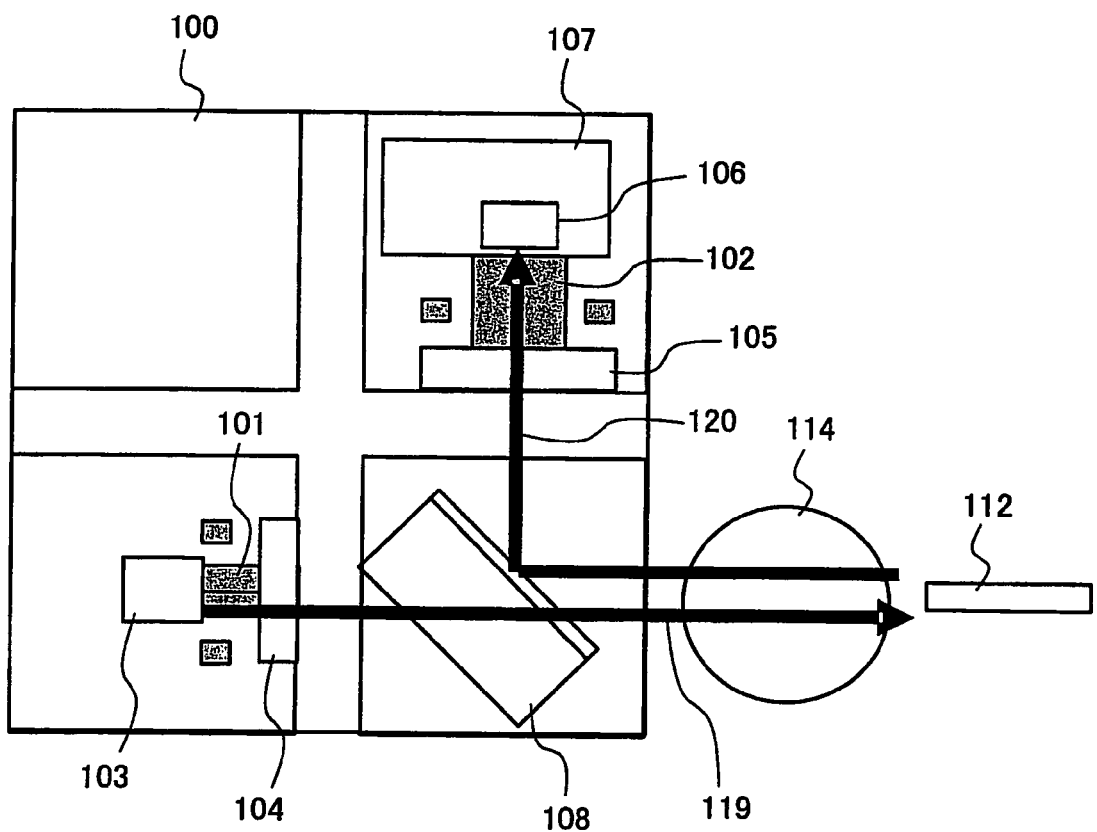
FIG. 3 is a plan view illustrating an optical path of the conventional optical communication module shown in FIG. 1.
Figure 8:
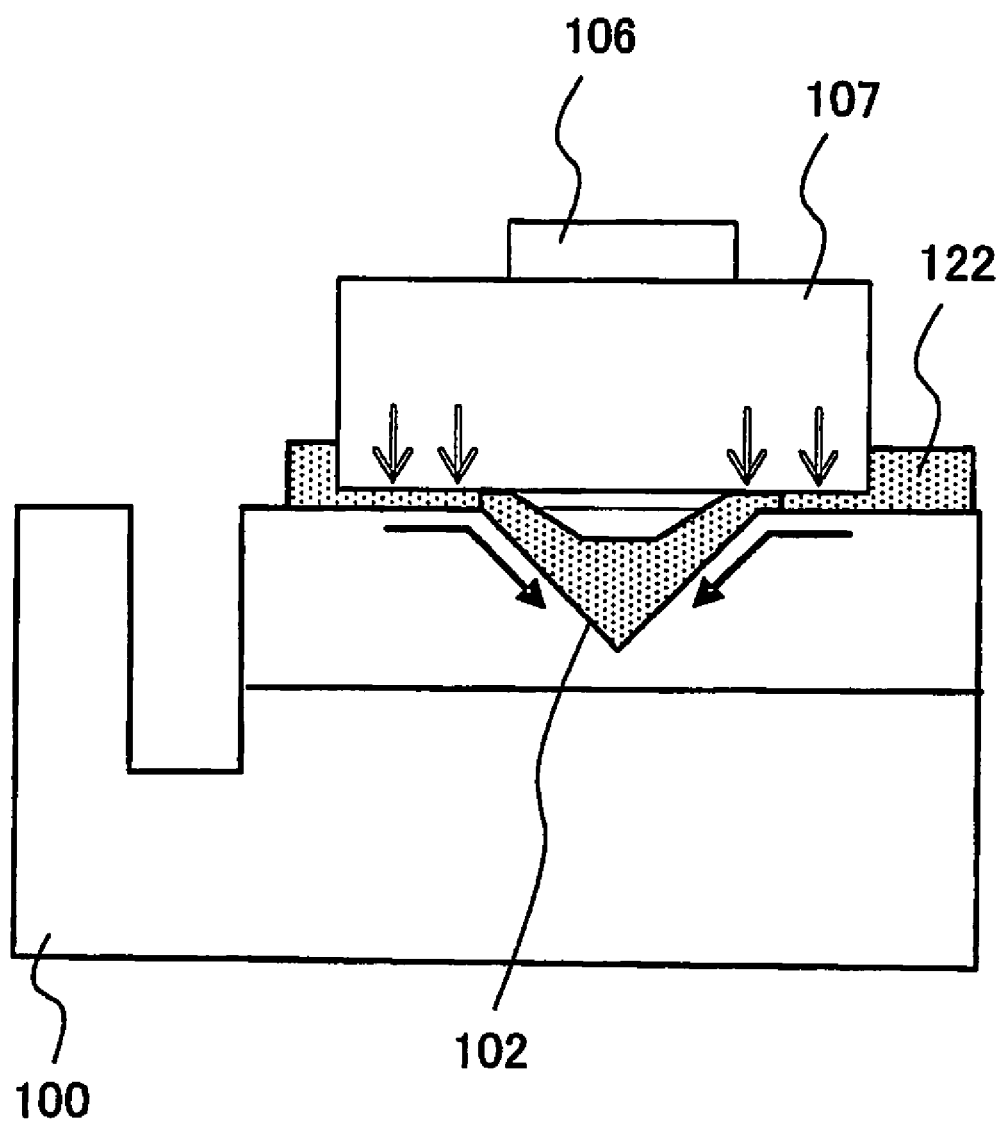
FIG. 8 is an illustrative view (side view) showing problems with the conventional optical communication module shown in FIG. 1.
Figure 9:
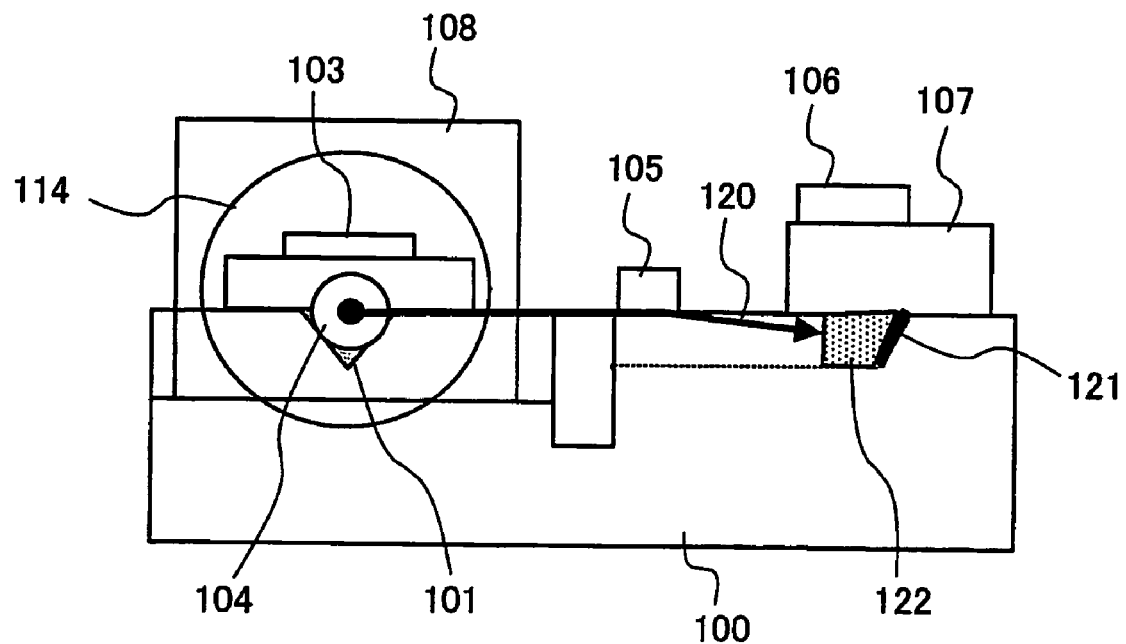
FIG. 9 is an illustrative view (side view of an optical path at the receiving end) showing problems with the conventional optical communication module shown in FIG. 1.

DESCRIPTION OF REFERENCE NUMERALS 200, 300, 400 Semiconductor substrate
201, 301, 401 Groove for optical path (V-groove) at the transmitting end
202, 302, 402 Groove for optical path (V-groove) at the receiving end
203, 303, 403 Light emitting element (LD)
204, 304, 404 Silicon lens at the transmitting end
205, 305, 405 Silicon lens at the receiving end
206, 306, 406 Light receiving element (PD)
207, 307 Glass element (glass substrate)
208, 308, 408 Wavelength filter (branching filter)
209, 309, 409 Alignment mark
213a, 413a First protective groove
213b, 413b Second protective groove
222, 322, 422 Adhesive resin
313a First convex bump
313b Second convex bump
430 Filter

DETAILED DISCLOSURE OF THE INVENTION

In the following detailed description of the preferred embodiments, reference is made to the accompanying drawings which form a part hereof, and in which is shown by way of illustration specific preferred embodiments in which the inventions may be practiced. These preferred embodiments are described in sufficient detail to enable those skilled in the art to practice the invention, and it is to be understood that other preferred embodiments may be utilized and that logical, mechanical and electrical changes may be made without departing from the spirit and scope of the present inventions. The following detailed description is, therefore, not to be taken in a limiting sense, and scope of the present inventions is defined only by the appended claims.

Embodiment 1

An optical communication module associated with the present invention mounts as a whole the elements for both transmission and reception on a single silicon substrate 200 to realize bi-directional communication. A V-groove 202 for an optical path and a small groove 213b proximal to an alignment mark 209 are formed on the silicon substrate 200. This configuration prevents an adhesive resin from flowing into the alignment mark 209 and the V-groove 202 caused by excessive amount of the resin or spreading of the resin pressed by elements in the resin application or the elements fixation processes. A process of precisely mounting the element is thereby realized to yield a bi-directional communication module having a structure securing an optical path for light for reception.

Figure 10:
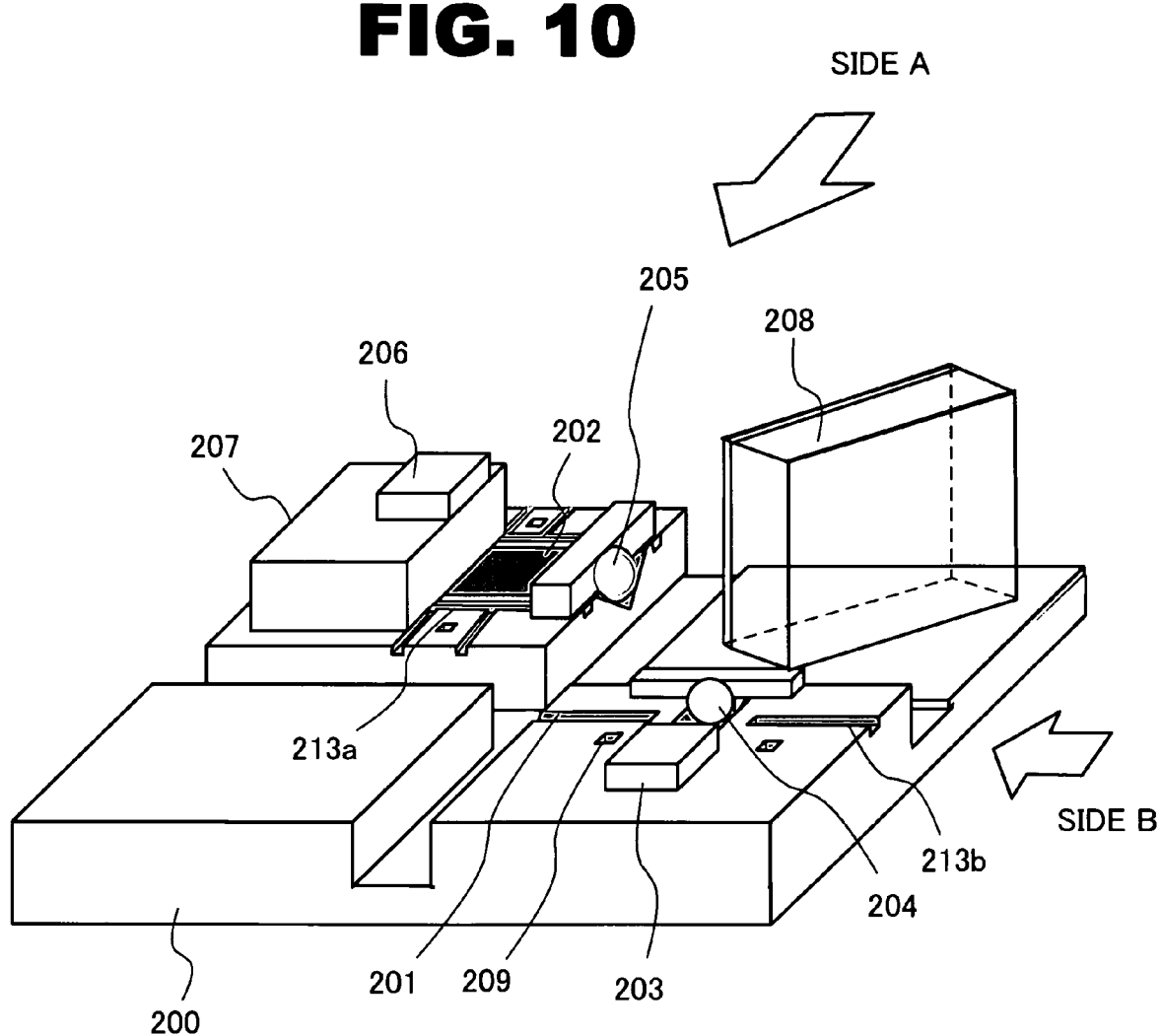
FIG. 10 is a perspective view illustrating a structure of an optical communication module associated with Embodiment 1 of the present invention.

FIG. 10 is a perspective view illustrating a structure of the optical communication module associated with Embodiment 1 of the present invention. FIG. 11 is a side view illustrating an appearance of FIG. 10 observed from Side A (receiving end) and Side B (transmitting end).

The optical communication module associated with the present Embodiment comprises a semiconductor substrate 200, a light emitting element 203 mounted on the semiconductor substrate 200 to output light for transmission (transmitted light) 219, a light receiving element 206 mounted with an adhesive resin 222 on the semiconductor substrate 200 to convert light received (received light) 220 to an electric signal and a wavelength filter (wavelength branching element) 208 to branch out the received light 220 guided to the light receiving element 206 and the transmitted light 219 output from the light emitting element 203. A groove for an optical path 202, through which the received light 220 passes to be guided to the light receiving element 206 and a first protective groove 213a formed around the groove for an optical path 202 of blocking the adhesive resin 222 from intruding into said groove for an optical path 202 are formed on the semiconductor substrate 200.

The semiconductor substrate 200 is composed of a silicon wafer, in which a groove is formed by dicing. A laser diode (LD) can be used as the light emitting element 203. A thermosetting resin and the like can be used as the adhesive resin 222. A photodiode (PD) can also be used as the light receiving element 206.

A plurality of alignment marks 209 and V-grooves 201, 202 with a V-shaped cross-section when laterally observed are formed on the semiconductor substrate 200 by anisotropic etching.

In the present Embodiment, the light receiving element 206 is fixed with the adhesive resin 222 onto a glass member 207, which is mounted on the semiconductor substrate 200. Mounting the light receiving element 206 on the semiconductor substrate 200 through the glass member 207 enables to electrically and optically separate (insulate) the light emitting element 203 from the light receiving element 206 mounted on a single semiconductor substrate 300.

As shown in FIG. 17, the first protective groove 213a is formed in a continuous three-sided rectangular shape surrounding a periphery of the groove for an optical path 202. One side of four sides of the rectangle is open so that this portion contacts the groove formed by dicing. A width, a depth and a distance from the groove for an optical path 202 of the first protective groove 213a are configured in consideration of a location and an amount of the adhesive resin 222 to be applied, a viscosity of the adhesive resin 222 and a size of the element to be mounted and the like. A cross-sectional shape of the protective grooves 213a, 213b is rectangular in the Figure, but a U-shape, a V-shape and the like may be used.

In the present Embodiment, a V-groove is formed to mount a silicon lens and the protective grooves 213a, 213b are formed together when the V-groove is formed, leading to a benefit of forming the protective groove without adding extra processes. For example, when the V-groove was set to have a size of 20 μm (micro meters) in width and 14 μm (micro meters) in depth of the groove, it was experimentally confirmed that each element could be precisely mounted regardless of an error with the location of the adhesive resin applied and the size of an amount of the resin applied.

Moreover, a planar configuration of the first protective groove 213a is not necessarily in a form of three-sided rectangle but may be a U-shape and the like so far as it has a shape of surrounding the groove for an optical path 202.

The first protective groove 213a may not also be continuous, but may be intermittent depending on a state of a location of the adhesive resin applied and the like. However, use of the continuous shape can reliably prevent the adhesive resin from intruding into the groove for an optical path 202. In the present Embodiment and following Embodiment 2 or later, a protective groove is not formed around the groove for an optical path 201, but a protective groove is preferably similarly formed when the light emitting element 203 is fixed with the adhesive resin.

A plurality of the concave alignment marks 209 is formed on the semiconductor substrate 200 in order to align the position on said substrate 200. A second protective groove 213b is formed near the alignment mark 209 in order to block the adhesive resin 222 from intruding into said alignment mark 209.

As shown in FIG. 17, the second protective groove 213b is herein formed between a region to be coated with resin as a resin-coated region, to which the adhesive resin 222 is applied and the alignment mark 209. A width, a depth and a distance from the alignment mark 209 of the second protective groove 213b are configured in consideration of the location and viscosity of the adhesive resin 222 to be applied.

The light receiving element 206 comprises a body part consisting of the semiconductor substrate and a light receiving part formed on the bottom side (side of glass member 207) of said body part. A wavelength filter (not shown) is configured between the substrate 200 and the glass member 207 (bottom surface of glass member 207) in order to block an unnecessary light such as transmitted light output from the light emitting element 203 and the like.

The optical communication module associated with the present Embodiment further comprises a silicon lens for output 204 of diffracting the transmitted light 219 output from the light emitting element 203 and a silicon lens for input 205 of diffracting the received light 220 incident to the light receiving element 206. The silicon lenses 204, 205 are aligned based on the grooves for an optical path 201, 202 with a V-shape cross-section. At least part of the bottom surface of the light receiving element 206 is configured on the groove for an optical path 202. A reflective member 224 is configured on the groove for an optical path 202 to guide the received light 220 diffracted by the silicon lens for input 205 to the light receiving element 206.

As shown in FIG. 10 and the like, the silicon lenses 204, 205 have a structure of forming a cylindrical lens portion in the same thickness as a support with a prismatic shape. The center is aligned by contacting a periphery of the cylindrical lens with the inclined inner wall of the grooves for an optical path 201, 202 with a V-shape cross-section.

Each of basic compositions such as the silicon lenses 204, 205, a wavelength filter 208, a light emitting element 203, a light receiving element 206, the grooves for an optical path (V-grooves) 201, 202 and the like can use ones disclosed in Japanese Patent Publication 2006-154535.

Figure 12:
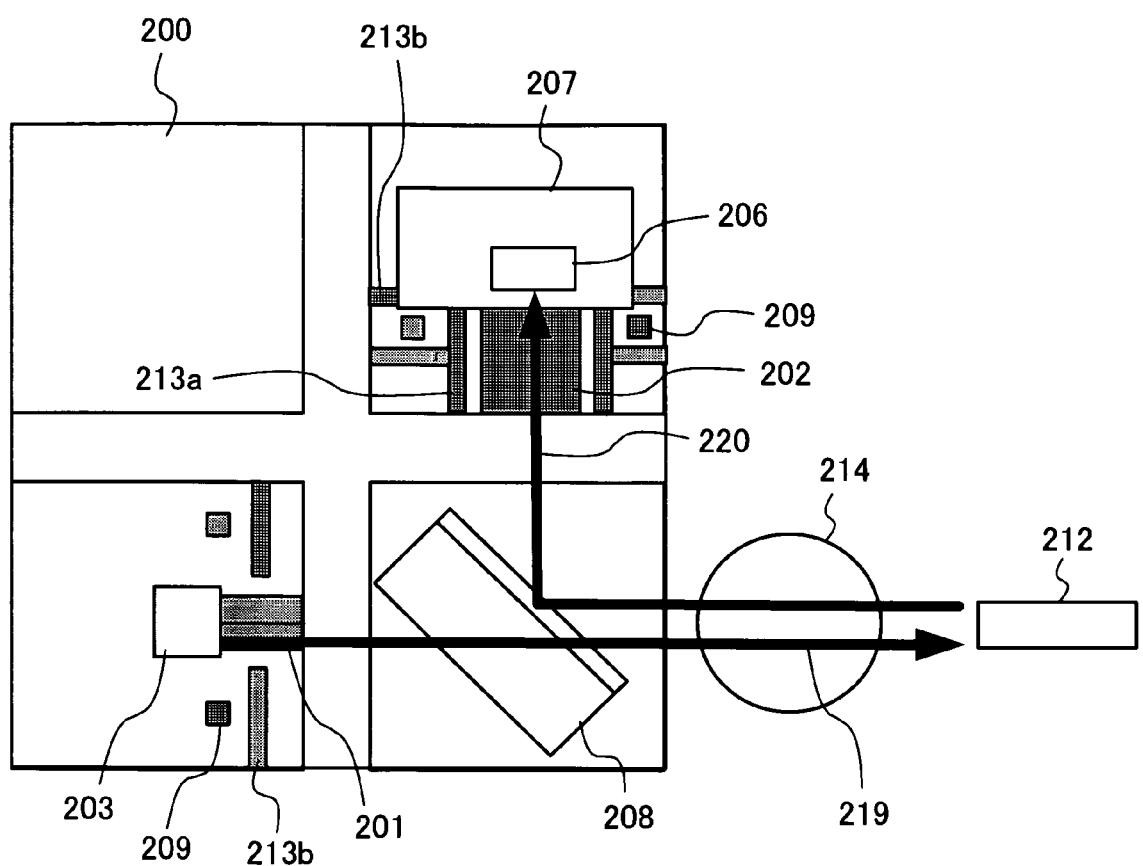
FIG. 12 is a plan view illustrating an optical path of the optical communication module associated with Embodiment 1 shown in FIG. 10.

FIG. 12 is a plan view illustrating an optical path of the optical communication module associated with Embodiment 1 shown in FIG. 10. FIG. 13 is a side view illustrating an optical path in the optical communication module associated with Embodiment 1 shown in FIG. 10 divided into the receiving end and the transmitting end. A method of bi-directional communication by the optical communication module of the present invention is described. As shown in FIGS. 12 and 13, the transmitted light 219 emitted from LD 203 is collimated by the proximal silicon lens 204 when transmitted. It thereafter enters into the ball lens 214 through the wavelength filter 208 to converge to the optical fiber 212.

On the other hand, when received, the received light 220 emitted from the optical fiber 212 is diffracted by the ball lens 214, followed by refraction by 90 degrees at a reflection film of the wavelength filter 208 to reach the silicon lens 205 at the receiving end. After the received light 220 is diffracted by the silicon lens 205, it passes within the groove for an optical path 202 at the receiving end to reach the reflection plane 224 (see FIG. 17) formed at a plane of the end in the groove 202. The light reflected at the reflection plane 224 of the groove 202 reaches through the glass element 207 the light receiving surface of the light receiving element 206 mounted on a top surface thereof.

Figure 14:
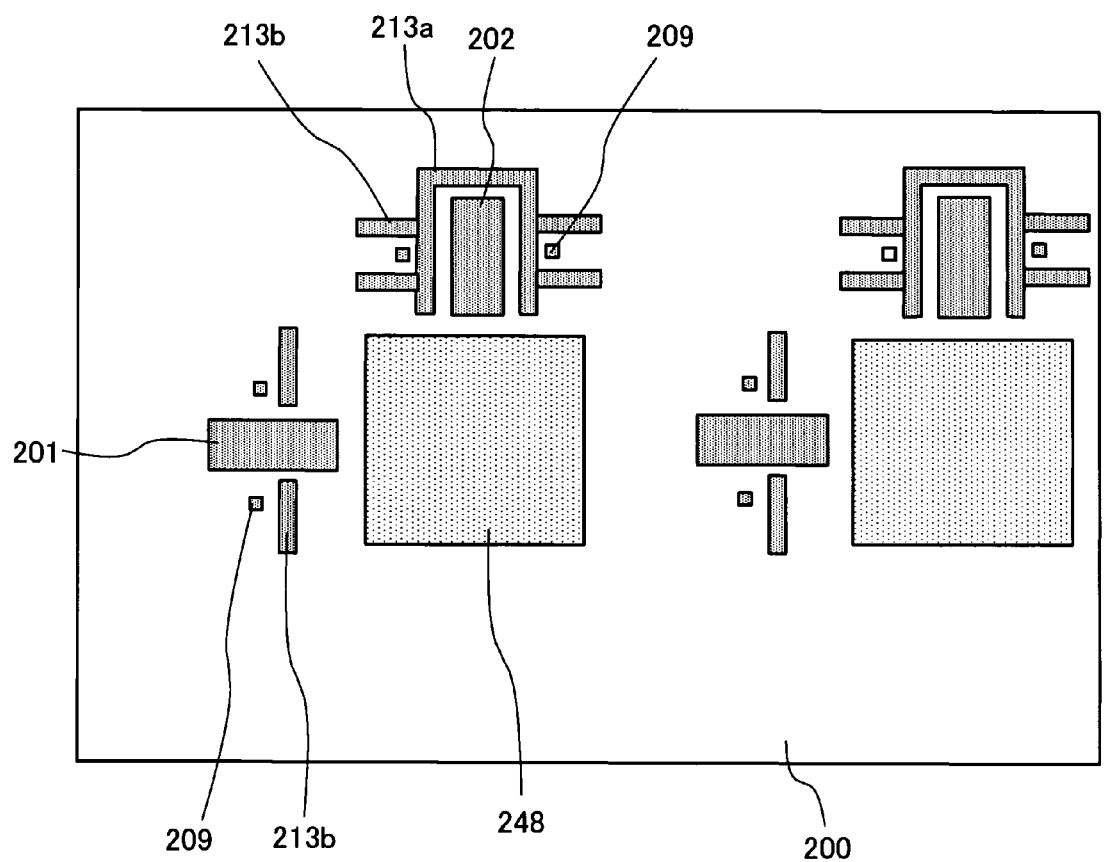
FIG. 14 is a top view illustrating part of processes to manufacture the optical communication module associated with Embodiment 1 shown in FIG. 10 and illustrates a state prior to individuation.
Figure 15:
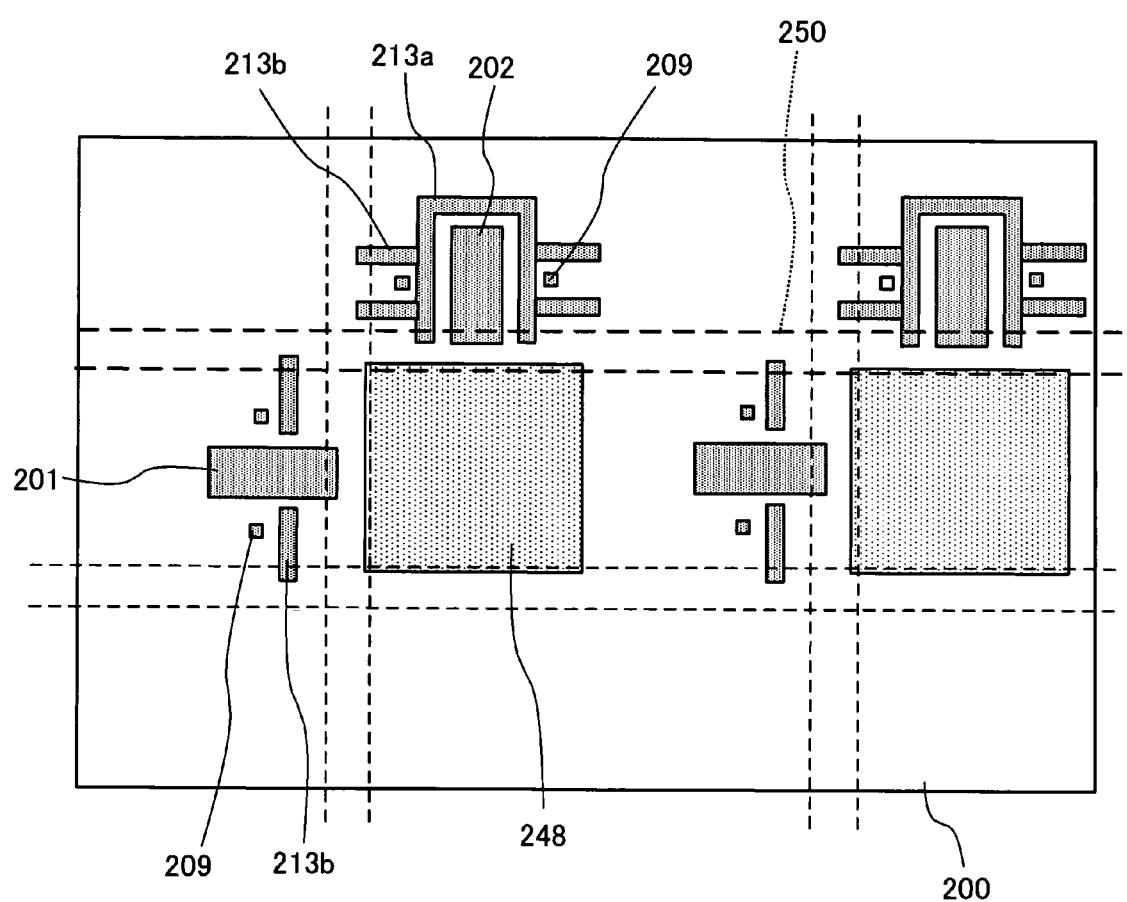
FIG. 15 is a top view illustrating part of processes to manufacture the optical communication module associated with Embodiment 1 shown in FIG. 10 and illustrates a state prior to individuation.
Figure 16:
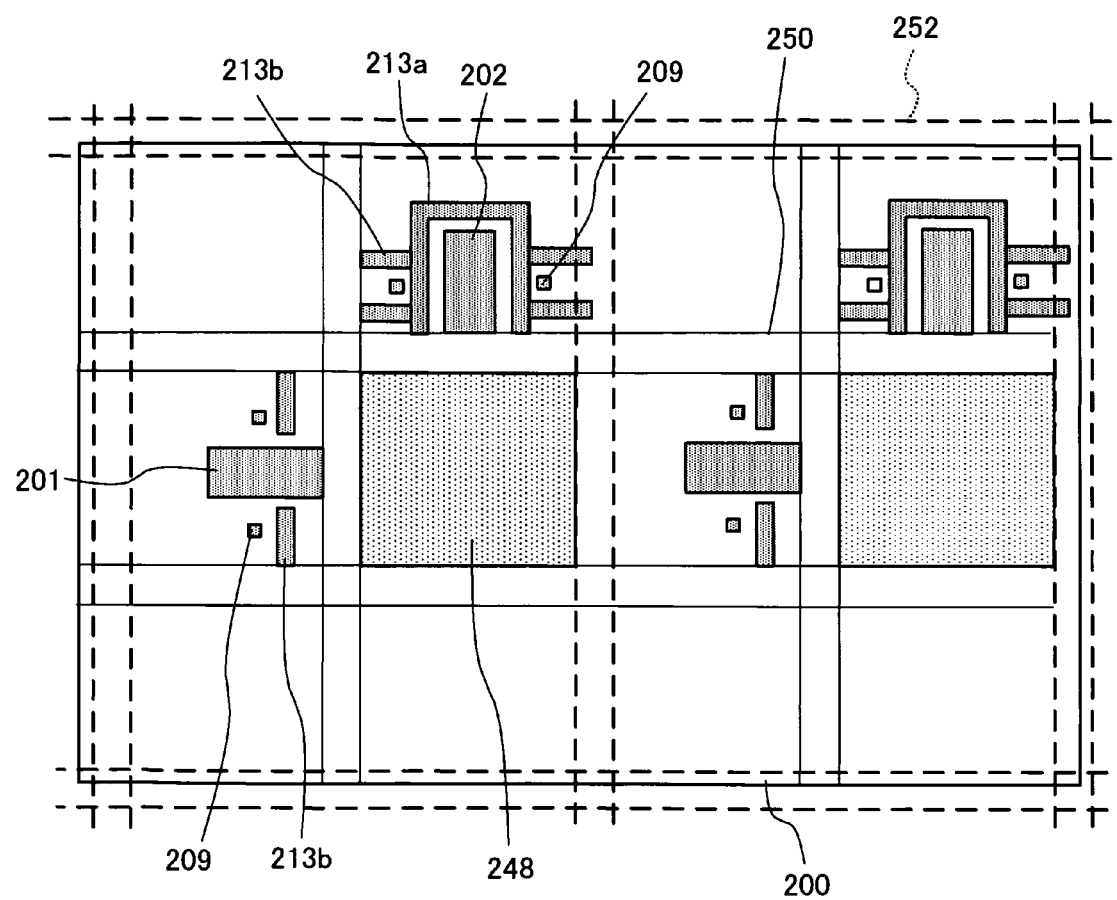
FIG. 16 is a top view illustrating part of processes to manufacture the optical communication module associated with Embodiment 1 shown in FIG. 10 and illustrates a state prior to individuation.

FIGS. 14 to 16 are top views illustrating part of processes to manufacture the optical communication module associated with Embodiment 1 shown in FIG. 10 and illustrate a state prior to individuation (wafering). A resist is at first applied to the substrate 200 and as shown FIG. 14, V-groove patterns 201, 202 to mount the element, an alignment pattern 209 for aligning, a pattern to prepare a filter mounting plane 248 and a pattern for protective grooves 213a, 213b to flee the resin are formed by light exposure based on a drawing of a board design. This substrate 200 is next wet-etched to form the V-grooves 201, 202 to mount the element, the alignment mark 209 for aligning, the filter mounting plane 248 and the protective grooves 213a, 213b to flee the resin. At this time, a depth of each groove is determined by an etching time and a pattern width and the narrower the pattern width is, the shallower is the depth.

As shown in FIG. 15, dicing is next performed along a dicing line 250 in order to expose cross-sections of the V-grooves 201, 202 for mounting the element. As shown in FIG. 16, dicing is thereafter performed along a dicing line 252 to provide separation between the substrates to individuate a chip. An individuated chip becomes one shown in FIG. 17.

FIGS. 17 to 22 are top and side views illustrating part of processes to manufacture the optical communication module associated with Embodiment 1 shown in FIG. 10 and illustrate the processes after individuating the chip. Mounting the optical elements such as a silicone lens and the like may be performed prior to individuation of the chip.

FIGS. 17, 18, 19, 20, 21 and 22 illustrate a state of an individuated semiconductor substrate, a state after mounting a laser diode on the semiconductor substrate, a state after mounting a silicon lens at the transmitting end, a state after mounting a silicon lens at the receiving end, a state after mounting both a glass element and a photodiode, and a state after mounting a wavelength filter, respectively.

The sequence of mounting each element preferably starts with basically an element requiring heat treatment at high temperature, followed by an element requiring low temperature treatment. The position of mounting each element is configured according to a prior optical design.

In the state of FIG. 17, the grooves for an optical path 201, 202, the alignment mark 209, the first protective groove 213a and the second protective groove 213b are formed in advance on the semiconductor substrate 200. Such grooves 201, 202, 209, 213a and 213b are formed by a well-known photolithography technique and anisotropic etching. The reflective film 224 is formed at an end of the groove for an optical path 202 at the receiving end.

As shown in FIG. 18, an electrode pad 240 is then formed at an end of the groove for an optical path 201 at the transmitting end and a solder film 242 is further formed thereon in order to adhere the light emitting element 203. The light emitting element 203 is thereafter adhered to and mounted on the solder film 242. At this time, the light emitting element 203 is picked up by a surface mount device to calculate a coordinate of mounting the light emitting element 203 from the alignment mark 209 configured on the semiconductor substrate 200 using an image recognition. A central coordinate of the light emitting element 203 is thereafter calculated similarly by image recognition to adjust the position of the light emitting element 203 by the surface mount device such that both coordinates agree each other. When the light emitting element 203 is coupled with the electrode pad 240 through the solder film 242, the light emitting element 203 is pressed against the solder film 242 and then thermally treated at a specified pressure and temperature (about 350 to 400° C.).

As shown in FIG. 19, the silicon lens 204 is next mounted in order to collimate light from the light emitting element 203 to emit. The silicon lens 204 can be adhered by the adhesive resin 222 to the semiconductor substrate 200. A given amount of the adhesive resin 222 is at first applied to both ends of the groove for an optical path 201, on which a lens on the semiconductor substrate 200 is mounted. The silicon lens 204 is thereafter picked up by the surface mount device similarly as a case of the light emitting element 203 to perform image recognition with the alignment mark 209 on the substrate 200, followed by adjusting the mounting position to press the silicon lens 204 and thermally treat at about 200° C. to fix.

As shown in FIG. 20, the silicon lens 205 is next mounted in order to guide incident light from the optical fiber 212 to the light receiving element 206. The adhesive resin 222 is used to adhere to the semiconductor substrate 200 similarly as adhesion of the silicon lens 204 at the light emitting element. A specified amount of the adhesive resin 222 is applied to both ends of the groove for an optical path 202, on which the silicon lens 205 is mounted, followed by picking up the silicon lens 205 to perform image recognition with the alignment mark 209 to adjust the mounting position and then press the silicon lens 205 to thermally treat at about 200° C. to fix.

As shown in FIG. 21, the light receiving element 206 is next mounted. When the glass element 207 is adhered to the light receiving element 206, a solider is used to at first adhere the electrode pad formed on a glass surface to the light receiving element 206. At this time, the alignment mark on the glass surface and the backside of the light receiving element 206 is used for alignment similarly as adhesion of the light emitting element to the substrate. The glass element 207, on the surface of which the light receiving element 206 is mounted is thereafter adhered to the substrate 200 using the thermosetting resin 222. In this manner, mounting of the light receiving element 206 on the glass element 207 is performed in a process flow independent from mounting on the substrate 200. The glass element 207, on which the light receiving element 206 is mounted is mounted on the substrate 200 after mounting the silicon lens 205 and before mounting the wavelength filter 208 similarly as the mounting of the light receiving element 206.

As shown in FIG. 22, the wavelength filter 208 is next mounted. The wavelength filter 208 is fixed with the adhesive resin 222 onto the semiconductor substrate 200. The mounting sequence is similar to those of the silicon lenses 204, 205 and the light receiving element 206. That is, after the resin 222 is applied to the mounting location, an image recognition is performed between the alignment mark 209 and the filter 208 to adjust the position and then the filter 208 is pressed and thermally treated to be fixed. A bidirectional communication module of the present Embodiment is manufactured through the process as described above.

According to Embodiment 1 of the present invention, the alignment mark 209 is isolated from the adhesive resin 222 by the second protective groove 213b. This can prevent the adhesive resin 222 from reaching the alignment mark 209 and retain a shape of the alignment mark 209, even if the location of the adhesive resin 222 applied deviates and an amount of the resin applied is excessive.

Figure 23:
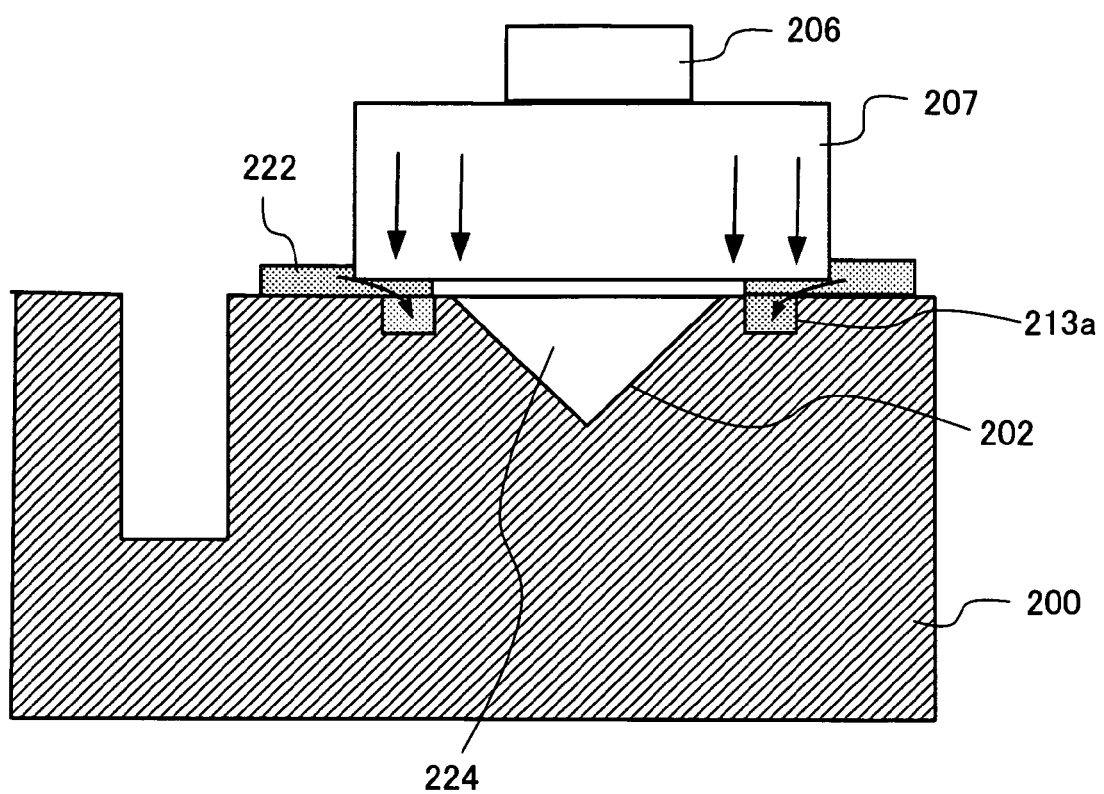
FIG. 23 is a view (cross-sectional view) describing a function of the optical communication module associated with Embodiment 1 shown in FIG. 10.

FIG. 23 is a view (cross-sectional view) describing a function of the optical communication module associated with Embodiment 1 shown in FIG. 10. As shown in FIG. 23, when mounting the element, the adhesive resin flatten by pressing the element flows into the first protective groove 213a before flowing into the groove for an optical path 202. The adhesive resin 222 flown into the first protective groove 213a moves along the protective groove 213a. This prevents the adhesive resin 222 from flowing into the groove for an optical path 202 before thermal curing, enabling to secure an optical path for the received light inside the groove for an optical path 202.

Embodiment 2

Figure 24:
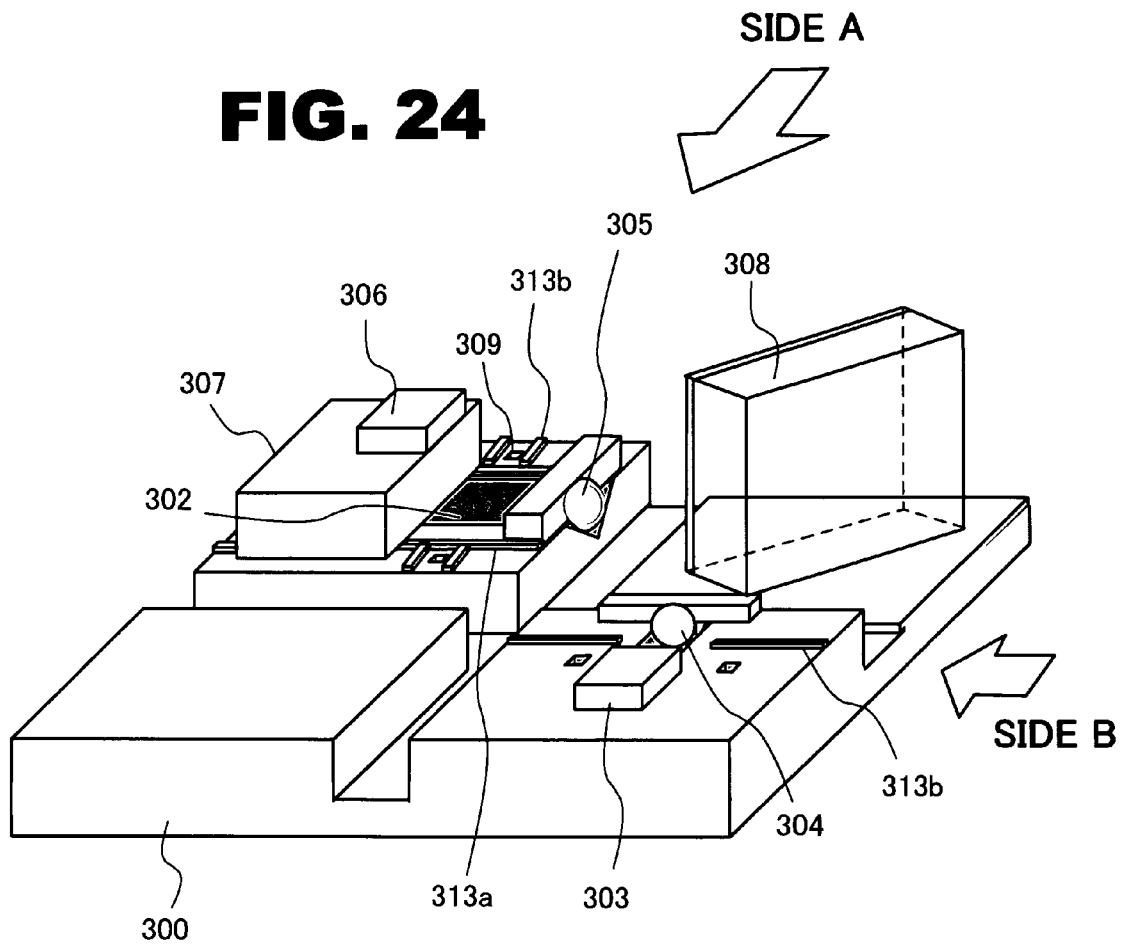
FIG. 24 is a perspective view illustrating a structure of an optical communication module associated with Embodiment 2 of the present invention.

FIG. 24 is a perspective view illustrating a structure of an optical communication module associated with Embodiment 2 of the present invention. FIG. 25 is a side view illustrating an appearance of FIG. 24 observed from Side A (receiving end) and Side B (transmitting end).

The optical communication module associated with the present Embodiment comprises a semiconductor substrate 300, a light emitting element 303 mounted on the semiconductor substrate 300 to output light for transmission (transmitted light) 319, a light receiving element 306 mounted with an adhesive resin 322 on the semiconductor substrate 300 to convert light received (received light) 320 to an electric signal and a wavelength filter (wavelength branching filter) 308 to branch out the received light 320 guided to the light receiving element 306 and the transmitted light 319 output from the light emitting element 303. A groove for an optical path 302, through which the received light 320 passes to be guided to the light receiving element 306 and a first convex bump 313a formed around the groove for an optical path 302 to block the adhesive resin 322 from intruding into said groove for an optical path 302 are formed on the semiconductor substrate 300.

The semiconductor substrate 300 is composed of a silicon wafer, in which a groove is formed by dicing. A laser diode (LD) can be used as the light emitting element 303. A thermosetting resin and the like can be used as the adhesive resin 322 (see FIG. 27). A photodiode (PD) can also be used as the light receiving element 306.

Similar to Embodiment 1, a plurality of alignment marks 309 for the alignment of the element when mounted and the V-grooves 301, 302 with a V-shape cross-section when laterally observed are formed on the silicon substrate 300 by anisotropic etching.

In the present Embodiment, the light receiving element 306 is mounted on a glass member 307 fixed with an adhesive resin 322 on the semiconductor substrate 300. The light receiving element 306 is mounted onto the semiconductor substrate 302 through the glass member 307 to electrically and optically separate (insulate) the light emitting element 303 from the light receiving element 306 mounted on a single semiconductor substrate 300.

As shown in FIG. 26, the first convex bump 313a is formed in a continuous three-sided rectangular shape surrounding a periphery of the groove for an optical path 302. One side of four sides of a rectangle is open so that this portion contacts the groove formed by dicing. A width, a height and a distance from the groove for an optical path 302 of the first convex bump 313a are configured in consideration of a location and an amount of the adhesive resin 322 to be applied, a viscosity of the adhesive resin 322, a size of the element to be mounted and the like.

A planar configuration of the first convex bump 313a is not necessarily in a form of a three-sided rectangle, but may be a U-shape and the like so far as it has a shape of surrounding the groove for an optical path 302. A shape of rectangle, semicircle, inverted triangle and the like may be used as a cross-sectional shape.

The first convex bump 313a may be also not continuous, but may be intermittent depending on a state of a location of the adhesive resin 322 applied and the like. However, use of the continuous shape can reliably prevent the adhesive resin from intruding into the groove for an optical path 302. In the present Embodiment, the convex bump is not formed around the groove for an optical path 301, but a protective groove is preferably similarly formed when the light emitting element 303 is fixed by the adhesive resin.

As described above, a plurality of concave alignment marks 309 is formed on the semiconductor substrate 300 in order to align the position on said substrate 300. A second convex bump 313b is formed near the alignment mark 309 in order to block the adhesive resin 322 from intruding into said alignment mark 309.

As shown in FIG. 27, the second convex bump 313b is herein formed between a region, to which the adhesive resin 322 is applied and the alignment mark 309. A width, a height and a distance from the alignment mark 309 of the second bump 313b are configured in consideration of a location and an amount of the adhesive resin 322 to be applied, a viscosity of the adhesive resin 322 and the like. For example, a width and height of the convex bumps 313a, 313b are set to be 25 μm (micro meters) and 20 μm (micro meters), respectively.

The light receiving element 306 comprises a body part consisting of the semiconductor substrate and a light receiving part formed on a bottom side (side of glass member 307) of said body part. A wavelength filter (not shown) is configured between the substrate 300 and the glass member 307 (bottom surface of glass member 307) in order to block unnecessary light such as the transmitted light output from the light emitting element 303 and the like.

Similar to Embodiment 1, the optical transmission and reception module associated with the present Embodiment further comprises a silicon lens for output 304 of diffracting the transmitted light 319 output from the light emitting element 303 and a silicon lens for input 305 of diffracting the received light 320 incident to the light receiving element 306.

The silicon lenses 304, 305 are aligned based on the grooves for an optical path 301, 302 with a V-shape cross-section. At least part of the bottom surface of the light receiving element 306 is configured on the groove for an optical path 302. A reflective member 324 is configured on the groove for an optical path 308 to guide the received light 320 diffracted by the silicon lens for input 305 to the light receiving element 306.

The silicon lenses 304, 305 have a structure of forming a cylindrical lens portion in the same thickness as a support with a prismatic shape. The center is aligned by contacting a periphery of the cylindrical lens part with the inclined inner wall of the grooves for an optical path 301, 302 with a V-shape cross-section.

Each of basic compositions such as the silicone lenses 304, 305, the wavelength filter 308, the light emitting element 303, the light receiving element 306, the grooves for an optical path (V-grooves) 301, 302 and the like may use ones disclosed in Japanese Patent Publication 2006-154535.

Since the optical path of the optical communication module associated with the present Embodiment is similar to Embodiment 1 (FIGS. 12 and 13), duplicated descriptions are omitted.

FIGS. 26 to 28 are top and side views illustrating part of processes to manufacture the optical communication modules associated with Embodiment 2 shown in FIG. 24. Among them, FIGS. 26, 27 and 28 show a state of the semiconductor substrate, a state posterior to applying the adhesive resin and a state after mounting a glass element and a photodiode, respectively. A method of mounting the silicon lens and the wavelength filter is similar to Embodiment 1, and thus omitted in the description of the present Embodiment. The sequence of mounting each element is similar to Embodiment 1 with respect to initiation with the element basically requiring thermal treatment at high temperature followed by the element requiring low temperature treatment.

In a state of FIG. 26, the grooves for an optical path 301, 302, the alignment mark 309, the first convex bump 313a and the second convex bump 313b are formed in advance on the semiconductor substrate 300. A reflective film 324 is also formed at an end of the groove for an optical path 302 at the receiving end. When forming the convex bumps 313a, 313b, after a resist is patterned a film is deposited by vapor deposition and the like on the location of the prospective convex bump 313a, 313b, and then the resist is removed.

As shown in FIG. 27, the adhesive resin 322 is next applied to a location onto which the silicon lenses 304, 305 are mounted and a location onto which the glass element 307 is mounted. In the present Embodiment, the adhesive resin 322 is applied around the glass element 307 thicker (higher) than the first convex bump 313a, since the glass element 307 is configured on the convex bump 313a.

As shown in FIG. 28, an image recognition is next performed between the light receiving element 306 fixed to the glass element 307 in advance and the alignment mark 309 to adjust the mounting position, followed by pressing and thermal treatment at about 200° C. to fix.

When the glass element 307 is adhered to the light receiving element 306, a solder is at first used to adhere an electrode pad formed on the glass surface to the light receiving element 306. At this time, the alignment mark on the glass surface and a backside of the light receiving element 306 is used to align similarly as adhesion of the light emitting element to the substrate. A thermosetting resin 322 is thereafter used to adhere the glass element 307, in which the light emitting element 306 is mounted on the surface to the substrate 300. In this manner, the light receiving element 306 is mounted on the glass element 307 in a process flow independent from mounting onto the substrate 300. The glass element 307, on which the light receiving element 306 is mounted is mounted on the substrate 300 after mounting the silicon lens and before mounting the wavelength filter 308 similarly as mounting of the light receiving element 306.

As can be seen above, Embodiment 2 of the present invention uses a second convex bump 313b to isolate the alignment mark 309 from the adhesive resin 322 so that the adhesive resin 322 does not reach the alignment mark 309 to retain the shape of the alignment mark 309, even if a location of the adhesive resin 322 applied deviates and an amount of the resin applied is excessive.

Figure 29:
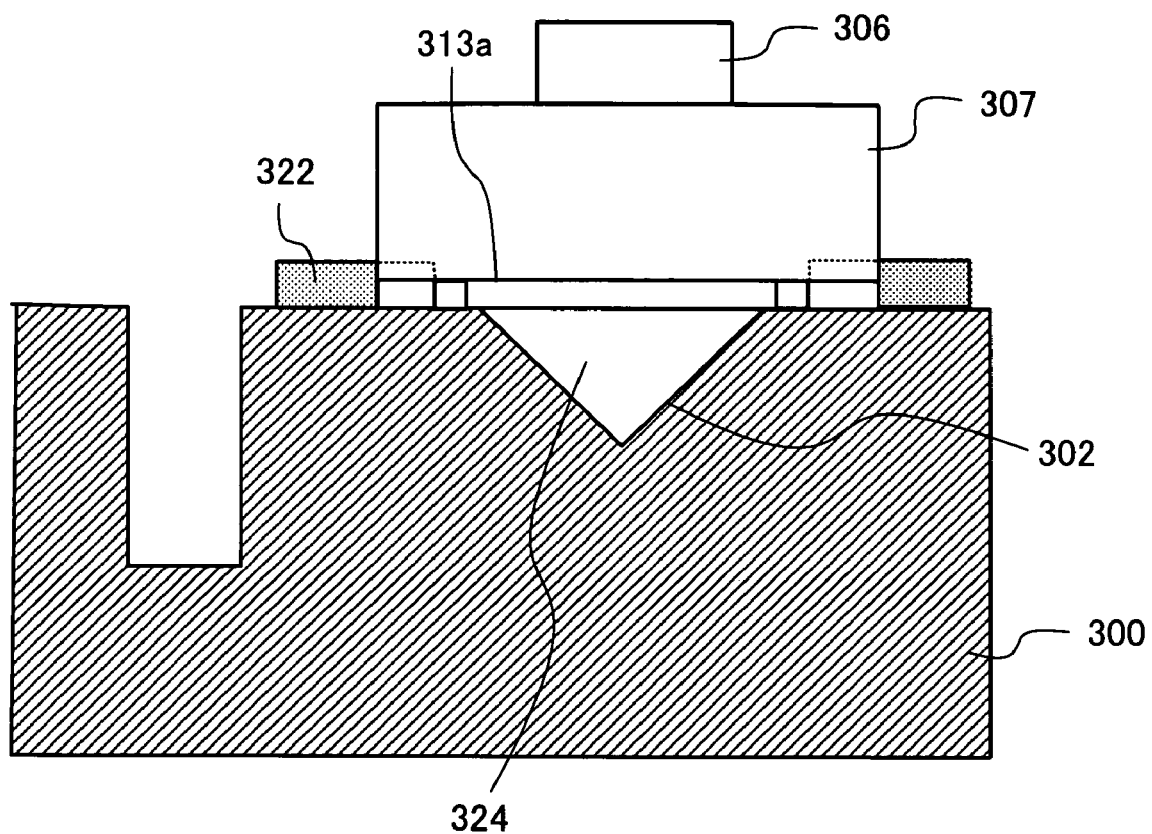
FIG. 29 is a view (cross-sectional view) describing a function of the optical communication module associated with Embodiment 2 shown in FIG. 24.

FIG. 29 is a view (cross-sectional view) describing a function of the optical communication module associated with Embodiment 2 shown in FIG. 24. As shown in FIG. 29, when mounting the element, the adhesive resin 322 flatten by pressing the element is blocked by the first convex bump 313a before flowing into the groove for an optical path 302. The adhesive resin 322 blocked by the first convex bump 313a can move along said convex bump 313a. This prevents the adhesive resin 322 from flowing into the groove for an optical path 302 before thermal curing, thus enabling to retain an optical path for the received light.

Embodiment 3

Figure 30:
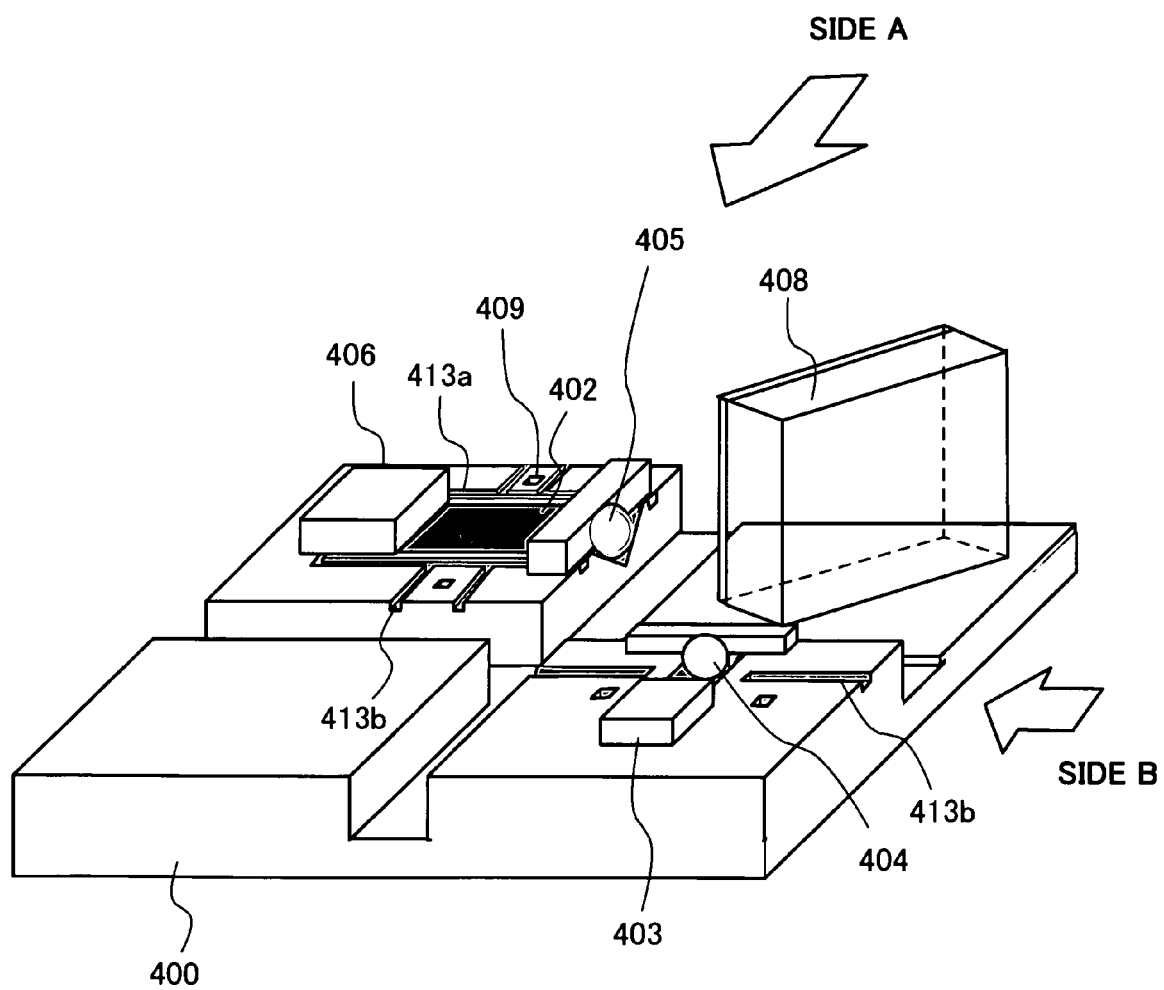
FIG. 30 is a perspective view illustrating a structure of an optical communication module associated with Embodiment 3 of the present invention.

FIG. 30 is a perspective view illustrating a structure of an optical communication module associated with Embodiment 3 of the present invention. FIG. 31 is top and side views illustrating part of processes to manufacture the optical communication module associated with Embodiment 3 shown in FIG. 30 and illustrates a state, in which the element is mounted on a semiconductor substrate via applying an adhesive resin.

The optical communication module associated with the present Embodiment comprises a semiconductor substrate 400, a light emitting element 403 mounted on the semiconductor substrate 400 to output a light for transmission (transmitted light), a light receiving element 406 mounted with an adhesive resin 422 on the semiconductor substrate 400 to convert a light received (received light) to an electric signal and a wavelength filter (wavelength branching filter ) 408 to branch out the received light guided to the light receiving element 406 and the transmitted light output from the light emitting element 403. A groove for an optical path 402, through which the received light passes to be guided to the light receiving element 406 and a first protective groove 413a formed around the groove for an optical path 402 to block the adhesive resin 422 from intruding into said groove for an optical path 402 are formed on the semiconductor substrate 400.

The semiconductor substrate 400 is composed of a silicon wafer, on which a groove is formed by dicing. A laser diode (LD) can be used as the light emitting element 403. A thermosetting resin and the like can be used as the adhesive resin 422 (see FIG. 31). A photodiode (PD) can also be used as the light receiving element 406.

Similar to Embodiments 1 and 2, a plurality of alignment marks 409 for the alignment of an element when mounted and V-grooves 401, 402 with a V-shape cross-section when laterally observed are formed on the silicon substrate 400 by anisotropic etching.

In the present Embodiment, the light receiving element 406 is directly mounted with the adhesive resin 422 on the semiconductor substrate 400, differing from Embodiments 1 and 2 described above. The composition other than a mounting method of the light receiving element 406 is similar to Embodiment 1 so that duplicated description is omitted. In the present Embodiment, the light receiving element 406 is directly mounted on the semiconductor substrate 400 so that a position, a size and the like of the first protective groove 413a are determined in consideration of an adhesion area of said light receiving element 406.

Figure 33:
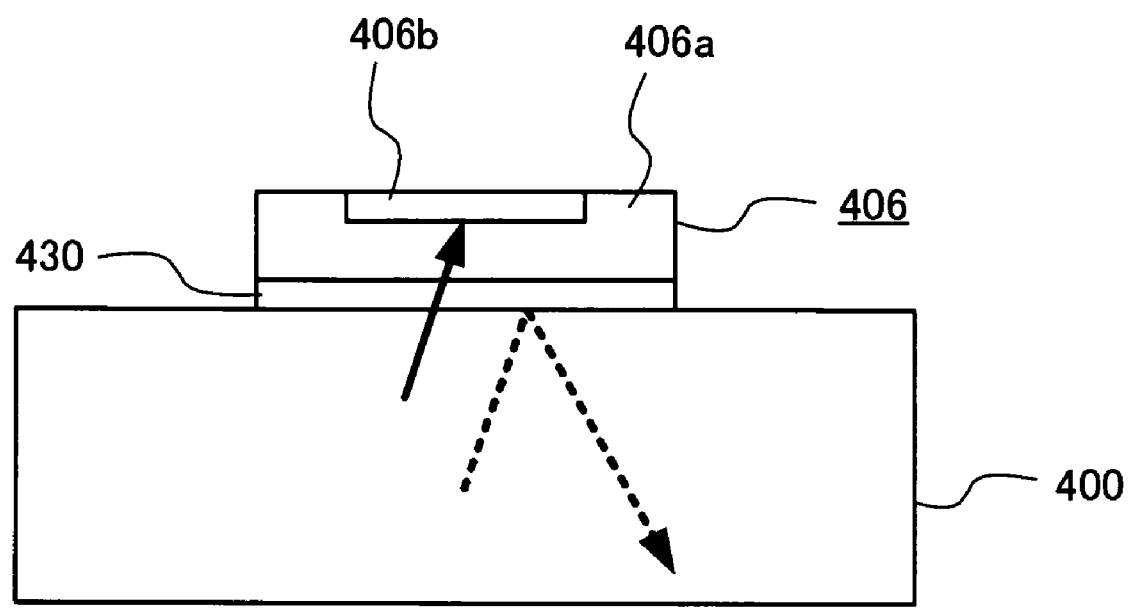
FIG. 33 is an illustrative view illustrating a structure around a light receiving element of the optical communication module associated with Embodiment 3 of the present invention.

FIG. 33 is an illustrative view illustrating a structure around the light receiving element 406 associated with the present Embodiment. The light receiving element 406 comprises a body part 406a consisting of the semiconductor substrate and a light receiving part 406b formed on the top side (opposite side of the substrate 400) of said body part 406a. A wavelength filter 430 is also configured between the substrate 400 and the light receiving element 406 (bottom surface of the light receiving element 406) in order to block unnecessary light such as a transmitted light output from the light emitting element 403. A substrate, which passes at least the received light, for example, an indium phosphide (InP) substrate is used as the body part 406a of the light receiving element 406. The light receiving part 406b can be configured with, for example, indium gallium arsenide (InGaAs) formed on the InP substrate. The wavelength filter 430 allows at least the received light of wavelength at 1.49 µm (micro meters) to pass through and blocks the transmitted light of wavelength at 1.31 µm (micro meters).

Similar to Embodiment 1, the optical transmission and reception module associated with the present Embodiment further comprises a silicon lens for output of diffracting the transmitted light output from the light emitting element 403 and a silicon lens for input 405 of diffracting the received light incident to the light receiving element 406. Each of basic compositions such as the silicon lenses 404, 405, the wavelength filter 408, the light emitting element 403, the light receiving element 406, the grooves for optical path (V-grooves) 401, 402 and the like can use ones disclosed in Japanese Patent Publication 2006-154535.

As can be seen above similar to Embodiment 1, the present Embodiment uses the second protective groove 413b to isolate the alignment mark 409 from the adhesive resin 422 so that the adhesive resin 422 does not reach the alignment mark 409 to retain a shape of the alignment mark 409 even if the location of the adhesive resin 422 applied deviates or an amount of the resin applied is excessive. The adhesive resin 422, flattened by pressing the element, is flown into the first protective groove 413a before flowing into the groove for an optical path 402 when the element is mounted. The adhesive resin 422 flown into the first protective groove 413a can move along the protective groove 413a. This prevents the adhesive resin 422 from flowing into the groove for an optical path 402 before thermal curing, thus enabling to retain an optical path for the received light.

Figure 32:
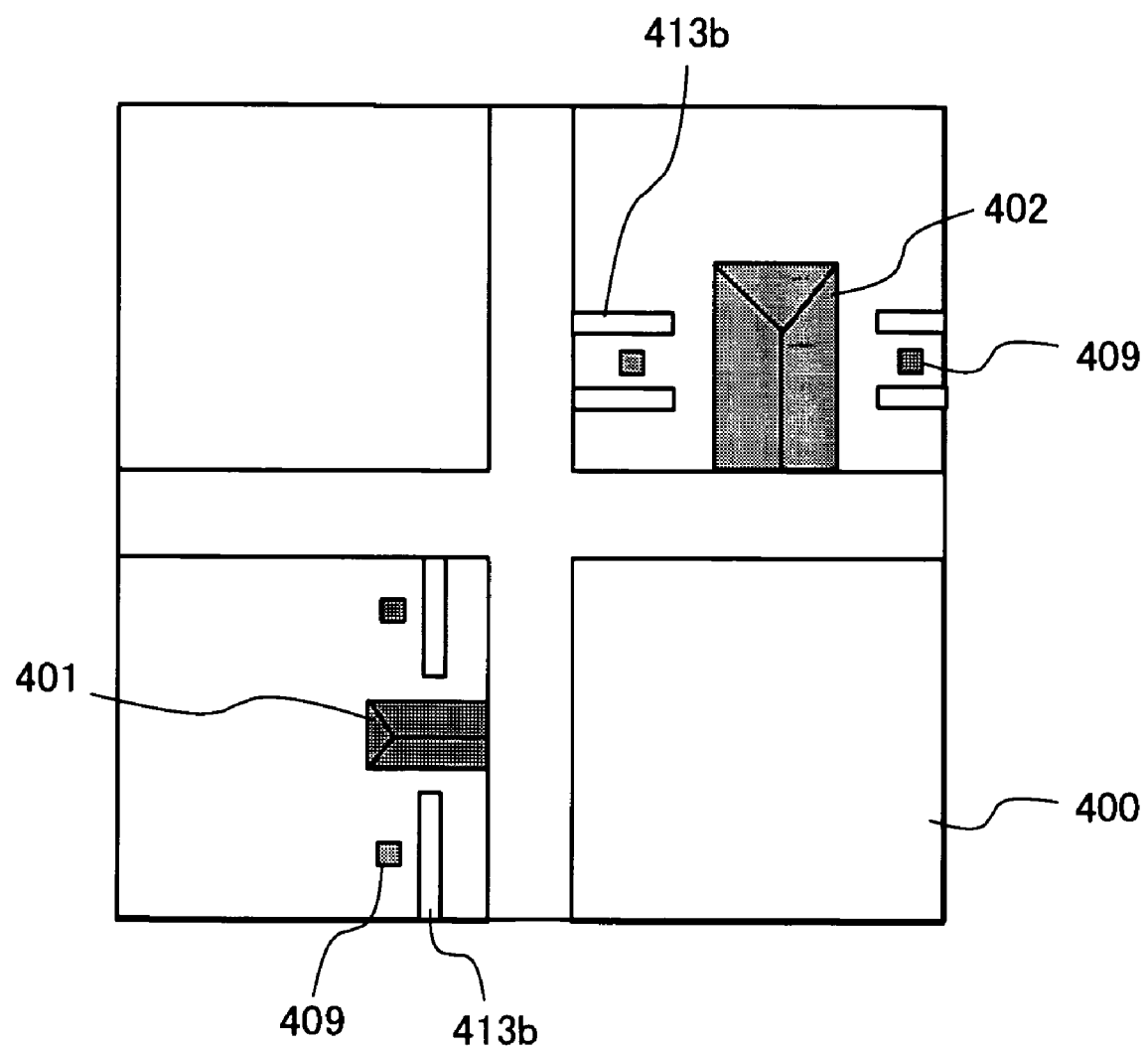
FIG. 32 is a schematic plan view illustrating a separate aspect of Embodiment 3 in the present invention.

As shown in FIG. 32, the first protective groove 413a can be omitted in the present Embodiment in consideration of an adhesion area of the light receiving element 406, since said light receiving element 406 is directly mounted on the semiconductor substrate 400. Use of such a configuration as FIG. 32 can secure a sufficient adhesion area for the light receiving element 406.

The present invention is described with Embodiments above, but not limited by these Embodiments and can be modified within the same technical idea given in the Claims. For example, while a V-shaped groove for an optical path is formed on a semiconductor substrate in the above Embodiments, the groove for an optical path might not be required depending on a shape and a mounting method of a silicon lens. In such a case, a protective groove or a convex part is formed in order to block an adhesive resin from flowing into other concave part such as mainly an alignment mark and the like.

What is claimed is:

1. An optical communication module, comprising:
    a semiconductor substrate including a resin-coated region;
    an optical path groove formed in the substrate;
    a first protective groove formed in the substrate between the optical path groove and the resin-coated region;
    a reflective member disposed in the optical path groove;
    a glass substrate disposed on the semiconductor substrate and at least partially covering the optical path groove and the reflective member;
    an adhesive resin coated on the resin-coated region to attach the glass substrate to the semiconductor substrate; and
    a light receiving element mounted on said semiconductor substrate to receive light reflected by the reflective member.

2. The optical communication module according to claim 1, wherein said first protective groove is formed to surround three sides of said path groove.

3. The optical communication module according to claim 1, further comprising:
    a plurality of concave alignment marks formed on said semiconductor substrate; and
    a second protective groove formed on said semiconductor substrate around said alignment marks to block said adhesive resin from intruding into said alignment marks.

4. An optical communication module according to claim 3, wherein said first protective groove and said second protective groove are connected to each other to separate the resin-coated region from said optical path groove and said alignment marks.

5. The optical communication module according to claim 1, wherein said optical path groove has a cross-section which is a V-shape.

6. An optical communication module according to claim 1, wherein said first protective groove is arranged apart from said optical path groove.

7. An optical communication module according to claim 6, wherein said first protective groove is arranged under said glass substrate.

8. An optical communication module, comprising:
    a semiconductor substrate including a resin-coated region;
    an optical path groove formed in the substrate;
    a first convex bump formed in the substrate between the optical path groove and the resin-coated region;
    a reflective member disposed in the optical path groove;
    a glass substrate disposed on the semiconductor substrate and least partially covering the optical path groove and the reflective member;
    an adhesive resin coated on the resin-coated region to attach the glass substrate to the semiconductor substrate; and
    a light receiving element mounted on said semiconductor substrate to receive light reflected by the reflective member.

9. The optical communication module according to claim 8, wherein said first convex bump is formed to surround three sides of said groove for an optical path.

10. The optical communication module according to claim 8, further comprising:
    a plurality of concave alignment marks formed on said semiconductor substrate; and a second convex bump formed on said semiconductor substrate around said alignment marks to block said adhesive resin from intruding into said alignment marks.

11. An optical communication module according to claim 10, wherein said first convex bump and said second convex bump are connected to each other to separate the resin-coated region from said optical path groove and said alignment marks.

12. The optical communication module according to claim 8, wherein said optical path groove has a cross-section which is a V-shape.

13. An optical communication module according to claim 8, wherein said first convex bump is arranged under said glass substrate.

* * * * *